United States Patent
Nakagawa et al.

(10) Patent No.: US 11,631,423 B2
(45) Date of Patent: Apr. 18, 2023

(54) MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki (JP); Naoyuki Narita, Funabashi (JP); Masayuki Takagishi, Kunitachi (JP); Tazumi Nagasawa, Yokohama (JP); Tomoyuki Maeda, Kawasaki (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/587,339

(22) Filed: Jan. 28, 2022

(65) Prior Publication Data

US 2023/0045730 A1 Feb. 9, 2023

(30) Foreign Application Priority Data

Aug. 5, 2021 (JP) .............................. JP2021-128975

(51) Int. Cl.
*G11B 5/00* (2006.01)
*G11B 11/105* (2006.01)
*G11B 5/012* (2006.01)

(52) U.S. Cl.
CPC .................................. *G11B 5/012* (2013.01)

(58) Field of Classification Search
CPC ........... G11B 5/17; G11B 5/3133; G11B 5/09; G11B 5/012; G11B 5/313;
(Continued)

(56) References Cited

U.S. PATENT DOCUMENTS 7,616,412 B2 11/2009 Zhu et al.
8,767,346 B2 * 7/2014 Yamada ............... G11B 5/1278
360/125.3
(Continued)

FOREIGN PATENT DOCUMENTS

JP 2008-277586 A 11/2008
JP 2009-064499 A 3/2009
(Continued)

OTHER PUBLICATIONS

Suto, H. et al. "Magnetization dynamics of a flux control device fabricated in the write gap of a hard-disk-drive write head for high-density recording", J. Appl. Phys. 129, 103901 (2021), 8 pages.
(Continued)

*Primary Examiner* — Nabil Z Hindi
(74) *Attorney, Agent, or Firm* — Oblon, McClelland, Maier & Neustadt, L.L.P.

(57) ABSTRACT

According to one embodiment, a magnetic recording device includes a magnetic head and a controller. The magnetic head includes a first magnetic pole, a magnetic element including a first magnetic layer, and a coil. The controller is electrically connected to the magnetic element and the coil. The controller is configured to supply a recording current to the coil and supply an element current to the magnetic element. The recording current includes a first period of a first polarity, a second period of a second polarity, a third period that shifts from the first to second period, and a fourth period that shifts from the second to first period. The element current includes DC and AC components. The AC component in the first period is the same as the AC component in the second period, the AC component in the third period, and the AC component in the fourth period.

21 Claims, 12 Drawing Sheets

(58) Field of Classification Search
CPC .... G11B 2005/0021; G11B 2005/0024; G11B 5/6047; G11B 11/1056; G11B 11/1051
USPC ................. 360/59, 328; 369/13.32, 13.33
See application file for complete search history.

(56) References Cited

U.S. PATENT DOCUMENTS

| | | |
|---|---|---|
| 8,953,273 B1 | 2/2015 | Funayama |
| 8,995,085 B2 | 3/2015 | Yamada et al. |
| 9,129,617 B2 | 9/2015 | Yamada et al. |
| 10,127,931 B2 * | 11/2018 | Suto ................. G11B 5/313 |
| 2008/0268291 A1 | 10/2008 | Akiyama et al. |
| 2009/0059417 A1 * | 3/2009 | Takeo ................. G11B 5/1278 |
| | | 360/75 |
| 2014/0118861 A1 | 5/2014 | Funayama |
| 2017/0263272 A1 | 9/2017 | Funayama |

FOREIGN PATENT DOCUMENTS

| | | |
|---|---|---|
| JP | 2014-086122 A | 5/2014 |
| JP | 5558698 B2 | 7/2014 |
| JP | 2016-012384 A | 1/2016 |
| JP | 2017-162533 A | 9/2017 |

OTHER PUBLICATIONS

Okamoto, S. et al. "Microwave assisted magnetic recording technologies and related physics" Journal of Physics D: Applied Physics. 48 353001 (2015) 19 pages.

* cited by examiner

MAGNETIC RECORDING DEVICE

CROSS-REFERENCE TO RELATED APPLICATIONS

This application is based upon and claims the benefit of priority from Japanese Patent Application No. 2021-128975, filed on Aug. 5, 2021; the entire contents of which are incorporated herein by reference.

FIELD

Embodiments described herein relate generally to a magnetic recording device.

BACKGROUND

Embodiments described herein relate generally to a magnetic head and a magnetic recording device.

DETAILED DESCRIPTION

According to one embodiment, a magnetic recording device includes a magnetic head and a controller. The magnetic head includes a first magnetic pole, a magnetic element including a first magnetic layer, and a coil. The controller is electrically connected to the magnetic element and the coil. The controller is configured to supply a recording current to the coil and supply an element current to the magnetic element. The recording current includes a first period of a first polarity, a second period of a second polarity different from the first polarity, a third period that shifts from the first period to the second period, and a fourth period that shifts from the second period to the first period. The element current includes a DC component and an AC component. The AC component in the first period is the same as the AC component in the second period, the AC component in the third period, and the AC component in the fourth period.

First Embodiment

Figure 1A:
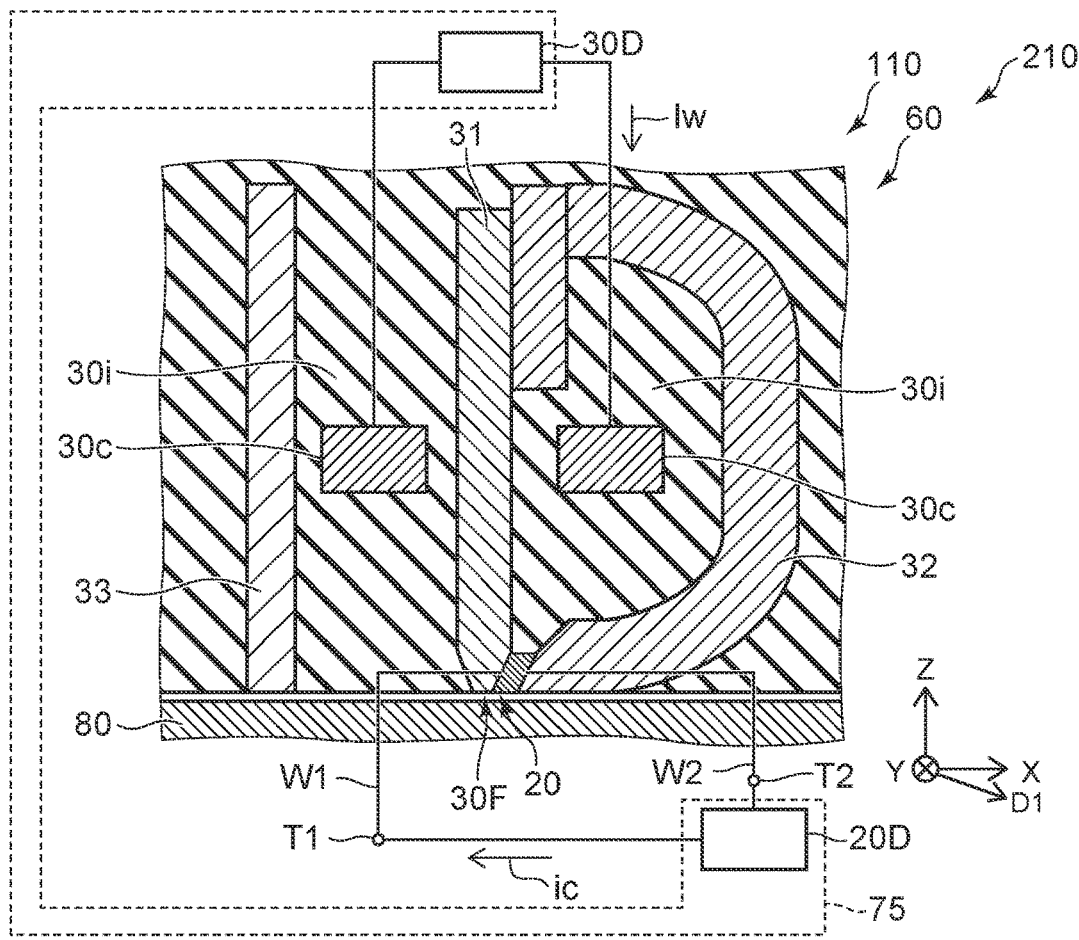
FIGS. 1A and 1B are schematic cross-sectional views illustrating a magnetic recording device according to a first embodiment.
Figure 1B:
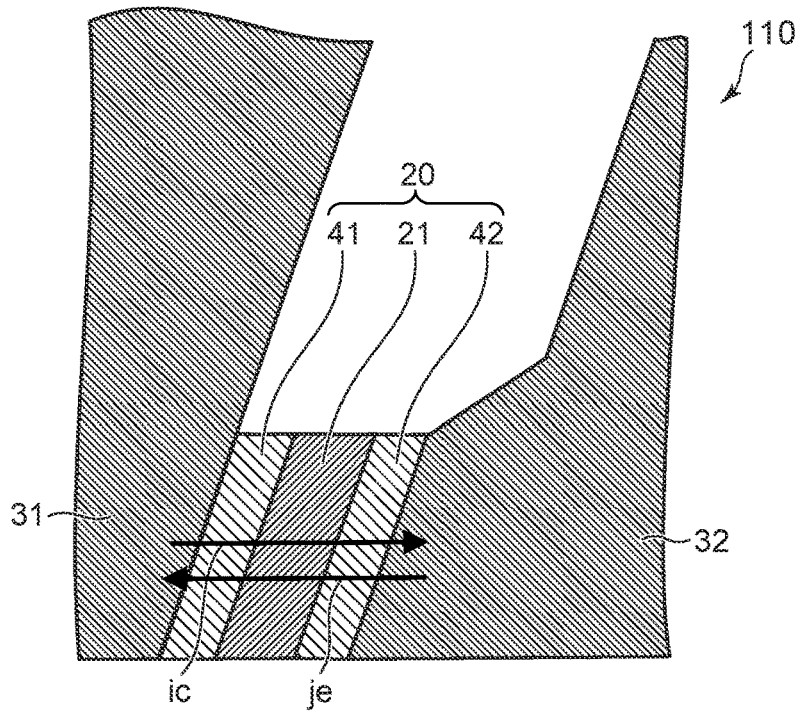

FIGS. 1A and 1B are schematic cross-sectional views illustrating a magnetic recording device according to a first embodiment.

FIG. 1B shows an enlarged part of FIG. 1A.

As shown in FIG. 1, a magnetic recording device 210 according to the embodiment includes a magnetic head 110 and a controller 75. The magnetic recording device 210 may include a magnetic recording medium 80. At least the recording operation is performed in the magnetic recording device 210. In the recording operation, information is recorded on the magnetic recording medium 80 by using the magnetic head 110.

The magnetic head 110 includes a recording part 60. As will be described later, the magnetic head 110 may include a reproducing part. The recording part 60 includes a first magnetic pole 31, a magnetic element 20, and a coil 30c. In this example, the magnetic head 110 includes a second magnetic pole 32. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a major magnetic pole. The second magnetic pole 32 is, for example, a trailing shield. The first magnetic pole 31 may be the trailing shield, and the second magnetic pole 32 may be the major magnetic pole.

A direction from the magnetic recording medium 80 to the magnetic head 110 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, a height direction. The X-axis direction corresponds to, for example, a down-track direction. The Y-axis direction corresponds to, for example, a cross-track direction. The magnetic recording medium 80 and the magnetic head 110 move relatively along the down-track direction. A magnetic field (recording magnetic field) generated from the magnetic head 110 is applied to a desired position of the magnetic recording medium 80. The magnetization of the magnetic recording medium 80 at the desired position is controlled in a direction corresponding to the recording magnetic field. As a result, information is recorded on the magnetic recording medium 80.

A direction from the first magnetic pole 31 to the second magnetic pole 32 is defined as a first direction D1. The first direction D1 is substantially along the X-axis direction. In the embodiment, the first direction D1 may be inclined with respect to the X-axis direction. An angle of inclination is, for example, more than 0 degrees and not more than 10 degrees.

In this example, a part of the coil 30c is between the first magnetic pole 31 and the second magnetic pole 32. In this example, a shield 33 is provided. In the X-axis direction, there is the first magnetic pole 31 between the shield 33 and the second magnetic pole 32. Another part of the coil 30c is between the shield 33 and the first magnetic pole 31. An insulating member 30i is provided between these multiple elements. The shield 33 is, for example, a leading shield. The magnetic head 110 may include a side shield (not shown).

As shown in FIG. 1A, a recording current Iw is supplied to the coil 30c from a recording circuit 30D. The recording magnetic field corresponding to the recording current Iw is applied to the magnetic recording medium 80 from the first magnetic pole 31.

As shown in FIG. 1A, the first magnetic pole 31 includes a medium-facing surface 30F. The medium-facing surface 30F is, for example, ABS (Air Bearing Surface). The medium-facing surface 30F faces, for example, the magnetic recording medium 80. The medium-facing surface 30F is, for example, along the X-Y plane.

As shown in FIG. 1A, the electric circuit 20D is electrically connected to the magnetic element 20. In this example, the magnetic element 20 is electrically connected to the first magnetic pole 31 and the second magnetic pole 32. The magnetic head 110 is provided with a first terminal T1 and a second terminal T2. The first terminal T1 is electrically connected to the magnetic element 20 via a first wiring W1 and the first magnetic pole 31. The second terminal T2 is electrically connected to the magnetic element 20 via a second wiring W2 and the second magnetic pole 32. From the electric circuit 20D, for example, an element current ic is supplied to the magnetic element 20.

The magnetic element 20 includes a first magnetic layer 21. In this example, as shown in FIG. 1B, the magnetic element 20 includes the first magnetic layer 21, a first non-magnetic layer 41, and a second non-magnetic layer 42. In FIG. 1B, the insulating portion 30i is omitted. For example, the first magnetic layer 21 includes at least one selected from the group consisting of Fe, Co and Ni. For example, the first non-magnetic layer 41 includes at least one selected from the group consisting of Cu, Au, Cr, V, Al and Ag. For example, the second non-magnetic layer 42 includes at least one selected from the group consisting of Ru, Ir, Ta, Rh, Pd, Pt and W.

As shown in FIG. 1B, the element current ic is supplied to such a magnetic element 20. The element current ic is supplied from, for example, the electric circuit 20D described above. As shown in FIG. 1B, the element current ic has an orientation from the first magnetic layer 21 to a second magnetic layer 22. As shown in FIG. 1B, an electron flow je accompanying the element current ic has an orientation from the second magnetic layer 22 to the first magnetic layer 21.

For example, when the element current ic not less than the threshold value flows through the magnetic element 20, the magnetization of the magnetic element 20 oscillates. The magnetic element 20 functions as, for example, an STO (Spin-Torque Oscillator). An alternating magnetic field (for example, high frequency magnetic field) is generated from the magnetic element 20 with the oscillation. The alternating magnetic field generated by the magnetic element 20 is applied to the magnetic recording medium 80, and writing to the magnetic recording medium 80 is assisted. For example, MAMR (Microwave Assisted Magnetic Recording) can be performed.

In this way, the controller 75 is electrically connected to the magnetic element 20 and the coil 30c. The controller 75 is configured to supply the recording current Iw to the coil 30c and supply the element current ic to the magnetic element 20.

Hereinafter, examples of the recording current Iw and the element current ic will be described.

Figure 2A:
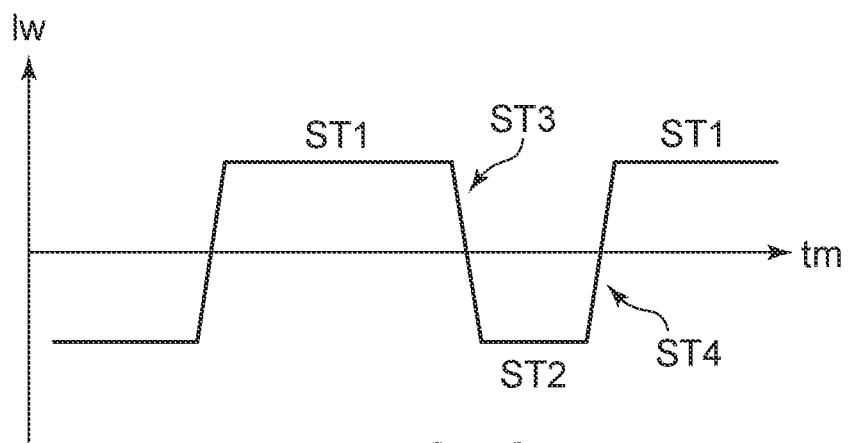
FIGS. 2A and 2B are schematic views illustrating operations of the magnetic recording device according to the first embodiment.
Figure 2B:
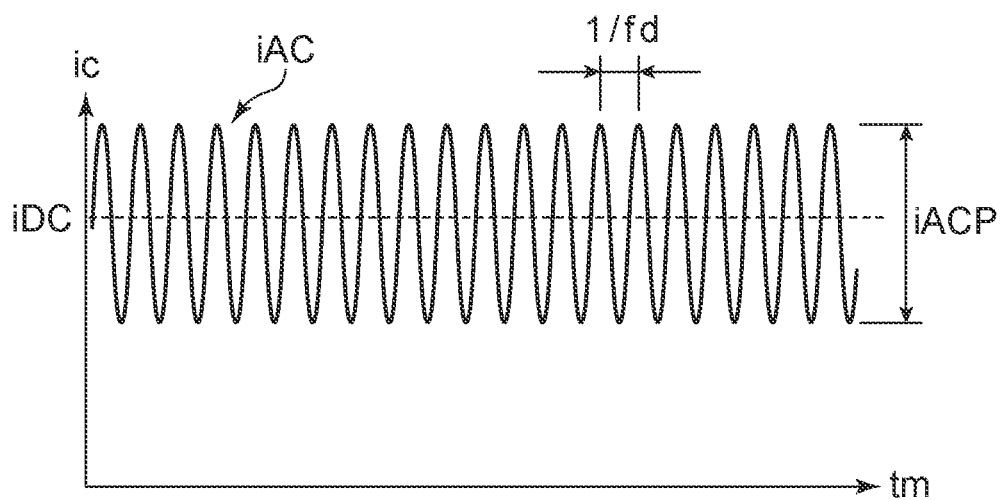

FIGS. 2A and 2B are schematic views illustrating operations of the magnetic recording device according to the first embodiment.

The horizontal axis of these figures is time tm. The vertical axis of FIG. 2A is the recording current Iw. The vertical axis of FIG. 2B is the element current ic.

As shown in FIG. 2A, the recording current Iw includes a period of a first polarity or a second polarity. The first polarity is one of positive or negative. The second polarity is different from the first polarity. The second polarity is the other of positive and negative. The recording current Iw includes a first period ST1 of the first polarity and a second period ST2 of the second polarity. The recording current Iw includes a third period ST3 that shifts from the first period ST1 to the second period ST2, and a fourth period ST4 that shifts from the second period ST2 to the first period ST1.

In one example, the first period ST1 corresponds to one of the recorded information 1 and 0, and the second period ST2 corresponds to the other of the recorded information 1 and 0.

In another example, the third period ST3 may correspond to one of the recorded information 1 and 0, and the fourth period ST4 may correspond to the other of the recorded information 1 and 0. In this case, it corresponds to the information in which the change in polarity is recorded.

The length of each of the first to fourth periods ST1 to ST4 changes according to the content of the recorded information. Such a recording current Iw is supplied to the coil 30c. As a result, a recording magnetic field corresponding to the recording current Iw is generated from at least one of the first magnetic pole 31 or the second magnetic pole 32. The generated recording magnetic field is applied to the magnetic recording medium 80. In the magnetic recording medium 80, the orientation of magnetization of the portion to which the recording magnetic field is applied is controlled. For example, the orientation of magnetization corresponds to the recorded information. In embodiments, for example, perpendicular magnetic recording is performed.

As shown in FIG. 2B, the element current ic includes a DC component iDC and an AC component iAC. The AC component iAC is, for example, a modulation component. As shown in FIGS. 2A and 2B, the AC component iAC is substantially constant regardless of the state of the recording current Iw.

For example, the AC component iAC in the first period ST1 is the same as the AC component iAC in the second period ST2, the AC component iAC in the third period ST3, and the AC component iAC in the fourth period ST4. For example, the change in the AC component iAC due to the influence of coupling or the like can be ignored.

For example, the AC component iAC has an amplitude iACP. For example, the amplitude iACP in the first period ST1 is substantially the same as the amplitude iACP in the second period ST2, the amplitude iACP in the third period ST3, and the amplitude iACP in the fourth period ST4. For example, the change in the amplitude iACP due to the influence of coupling or the like can be ignored.

For example, the AC component iAC has a frequency fd. For example, the frequency fd in the first period ST1 is substantially the same as the frequency fd in the second period ST2, the frequency fd in the third period ST3, and the frequency fd in the fourth period ST4. For example, the change in the frequency fd due to the influence of coupling or the like can be ignored.

By supplying such an element current ic to the magnetic element 20, the distribution of the frequency components of the alternating magnetic field generated in the magnetic element 20 becomes wide. Thereby, for example, the influence of the frequency fluctuation of the alternating magnetic field due to the processing variation of the magnetic element 20 can be practically suppressed. By widening the distribution of the frequency components of the alternating magnetic field, for example, even if the magnetic resonance frequency of the magnetic recording medium 80 fluctuates, the magnetic recording medium 80 tends to resonate with the alternating magnetic field. Practically stable MAMR can be performed. According to the embodiment, it is possible to provide a magnetic recording device capable of practically improving the recording density.

Figure 3A:
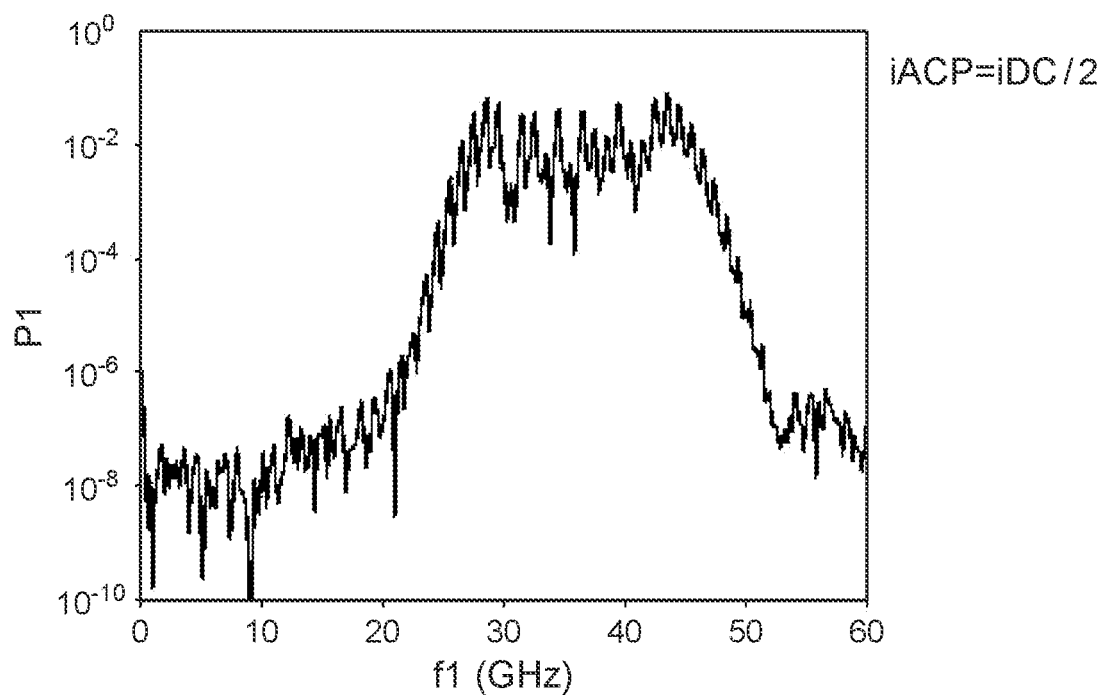
FIGS. 3A and 3B are schematic views illustrating characteristics of the magnetic recording device.
Figure 3B:
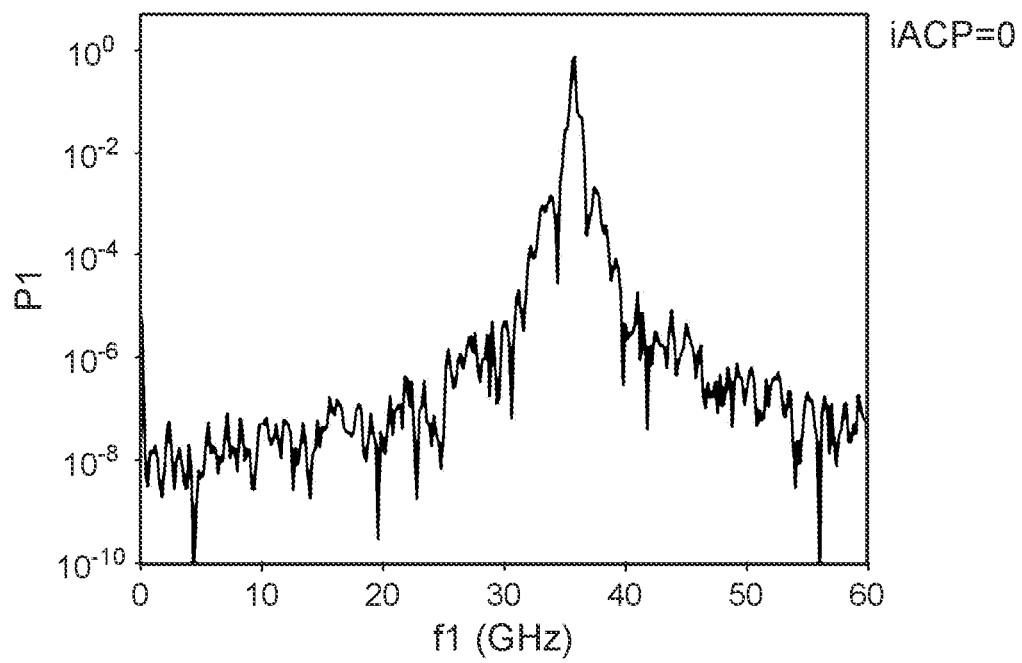

FIGS. 3A and 3B are schematic views illustrating characteristics of the magnetic recording device.

These figures illustrate simulation results of the FFT (Fast Fourier Transform) characteristics of the alternating magnetic field generated from the magnetic element 20. The horizontal axis of these figures is a frequency f1. The vertical axis of these figures is strength P1 (power density). In FIG. 3A, the element current ic includes the DC component iDC and the AC component iAC. In this example, the amplitude iACP of the AC component iAC is ½ of the DC component iDC. This condition corresponds to a modulation factor of 50%. In FIG. 3B, the element current ic includes the DC component iDC and does not include the AC component iAC. The modulation factor is 0%.

As shown in FIG. 3B, when the element current ic does not include the AC component iAC, the strength P1 of the alternating magnetic field has a sharp peak at about 36 GHz. In this case, the peak frequency of the alternating magnetic field fluctuates sensitively, for example, due to variations in the processing of the magnetic element 20. For example, the peak frequency of the alternating magnetic field tends to deviate from the magnetic resonance frequency of the magnetic recording medium 80. For example, even when the magnetic resonance frequency of the magnetic recording medium 80 fluctuates, the magnetic resonance frequency tends to deviate from the peak frequency of the alternating magnetic field. Therefore, it is difficult to perform effective MAMR.

On the other hand, as shown in FIG. 3A, when the element current ic includes the AC component iAC, the strength P1 of the alternating magnetic field is high in a wide range of about 26 GHz to about 44 GHz. For example, even when the processing of the magnetic element 20 varies, the change in the frequency characteristics of the alternating magnetic field is small. The effects of processing variations can be practically suppressed. For example, even when the magnetic resonance frequency of the magnetic recording medium 80 fluctuates, the magnetic recording medium 80 can stably resonate with the alternating magnetic field. Practically stable MAMR can be performed.

As described above, when the element current ic includes the AC component iAC, the alternating magnetic field includes a wide frequency component. This makes it possible to provide a magnetic recording device capable of practically improving the recording density.

Figure 4:
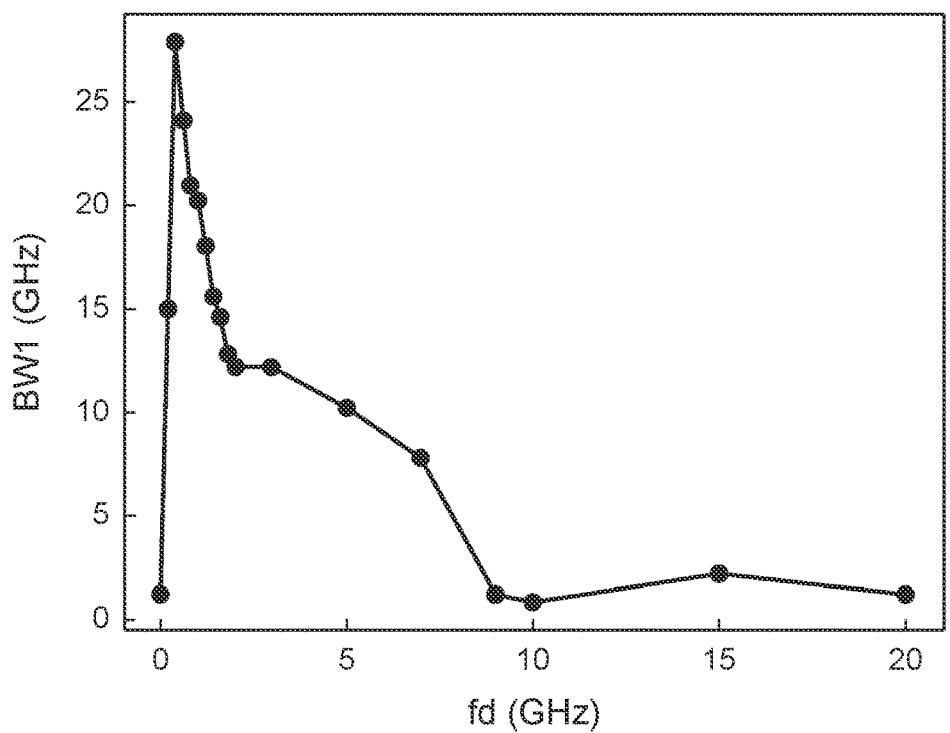
FIG. 4 is a graph illustrating characteristic of the magnetic recording device.

FIG. 4 is a graph illustrating characteristic of the magnetic recording device.

The horizontal axis of FIG. 4 is the frequency fd (modulation frequency) of the AC component iAC. The vertical axis is a bandwidth BW1. The bandwidth BW1 is a frequency range in which the strength P1 exceeds 10-2 (the difference between the highest frequency and the lowest frequency). In FIG. 4, the condition that the frequency fd is 0 corresponds to the case where the AC component iAC is not included. In this example, iACP/iDC=½ and the modulation factor is 50%.

As shown in FIG. 4, when the frequency fd is not less than 0.2 GHz and not more than 7 GHz, a large bandwidth BW1 can be obtained. When the frequency fd is not less than 0.2 GHz and not more than 1.6 GHz, a particularly large bandwidth can be obtained.

In the embodiment, the frequency fd of the AC component iAC is preferably not less than 0.2 GHz and not more than 7 GHz. As a result, the frequency component of the alternating magnetic field is effectively expanded. In the embodiment, it is more preferable that the frequency fd is not less than 0.2 GHz and not more than 1.6 GHz. The frequency component of the alternating magnetic field is effectively further expanded.

In the embodiment, the frequency fd of the AC component iAC is preferably not more than ⅕ of the frequency at which the strength P1 of the alternating magnetic field generated from the magnetic element 20 is the highest when the element current ic does not include the AC component iAC (see, for example, FIG. 3B). The frequency component of the alternating magnetic field is effectively further expanded. In the example of FIG. 3B, the frequency at which the strength P1 of the alternating magnetic field generated from the magnetic element 20 is maximum when the element current ic does not include the AC component iAC is about 36 GHz.

Figure 5:
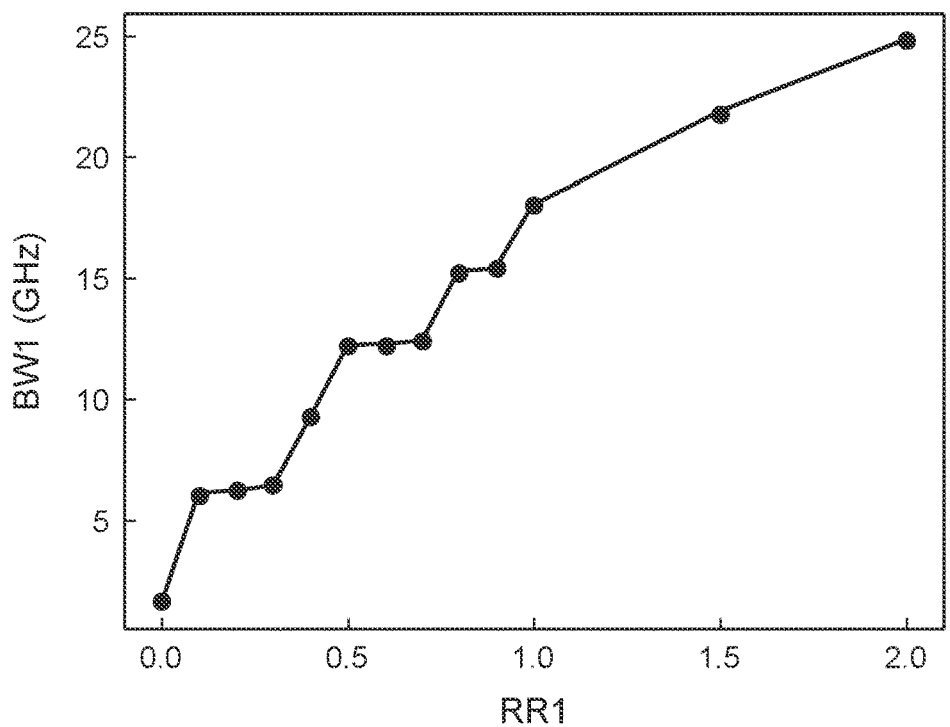
FIG. 5 is a graph illustrating characteristic of the magnetic recording device.

FIG. 5 is a graph illustrating characteristic of the magnetic recording device.

The horizontal axis of FIG. 5 is a modulation ratio RR1. The modulation ratio RR1 is the ratio (iACP/iDC) of the amplitude iACP of the AC component iAC to the absolute value of the DC component iDC. The vertical axis is the bandwidth BW1. In this example, the frequency fd of the AC component iAC is 3 GHz.

As shown in FIG. 5, the bandwidth BW1 increases as the modulation ratio RR1 increases. In the embodiment, the modulation ratio RR1 (ratio of the amplitude iACP of the AC component iAC to the absolute value of the DC component iDC) is, for example, not less than 0.1. The frequency component of the alternating magnetic field spreads effectively.

In the embodiment, the modulation ratio RR1 (ratio of the amplitude iACP of the AC component iAC to the absolute value of the DC component iDC) may be, for example, not less than 0.5. The frequency component of the alternating magnetic field spreads more effectively.

In the embodiment, the modulation ratio RR1 (ratio of the amplitude iACP of the AC component iAC to the absolute value of the DC component iDC) is, for example, not more than 2.0. In this case, the element current ic is positive and does not become negative.

In the embodiment, the current density of the element current ic in the magnetic element 20 is preferably not more than $5 \times 10^8$ A/cm$^2$, for example. As a result, the characteristics of the magnetic element 20 are likely to be stable. For example, damage to the magnetic element 20 is suppressed.

In the above example, the AC component iAC is sinusoidal. In the embodiments, the AC component iAC may have any waveform.

Figure 6A:
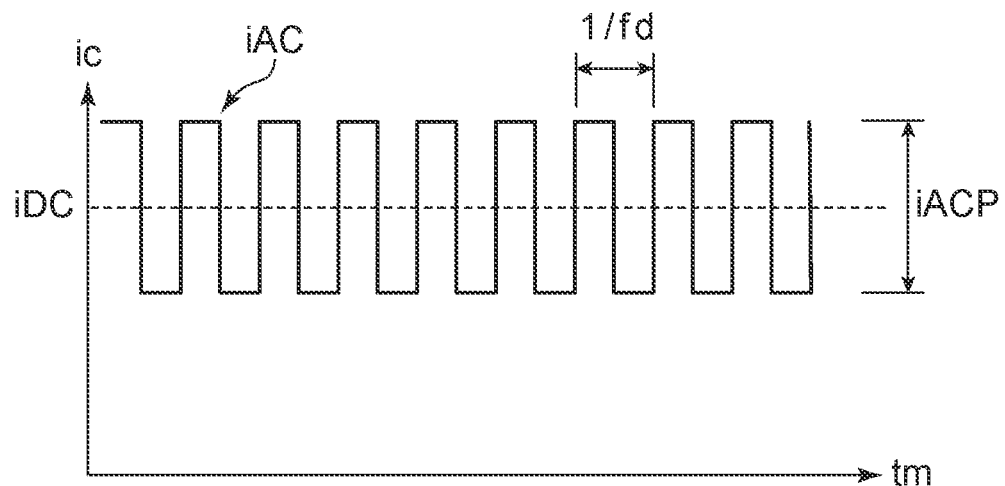
FIGS. 6A and 6B are schematic views illustrating operations of the magnetic recording device.
Figure 6B:
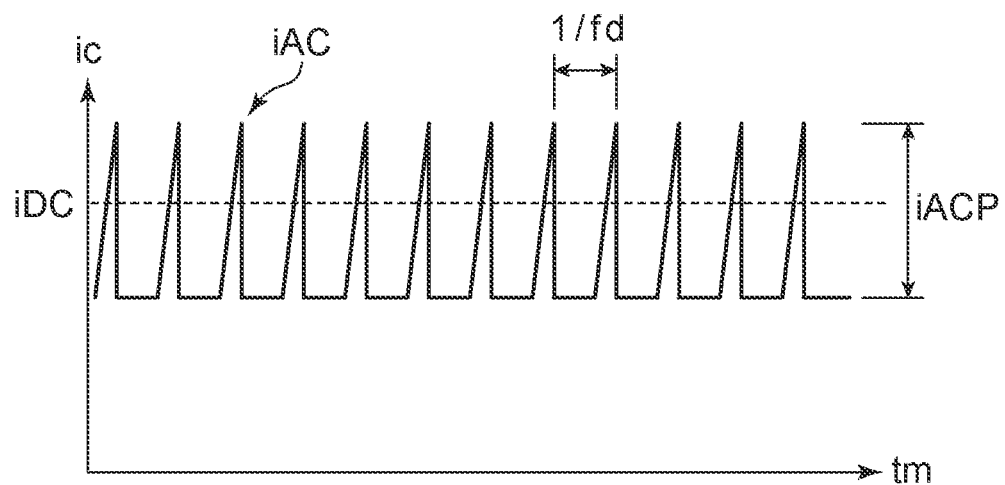

FIGS. 6A and 6B are schematic views illustrating operations of the magnetic recording device.

The horizontal axis of these figures is time tm. The vertical axis of these figures is the element current ic.

In the example shown in FIG. 6A, the AC component iAC has a square wave shape. The AC component iAC may have a triangular wave shape. In the example shown in FIG. 6A, the AC component iAC has a saw tooth shape. In the saw tooth shape, the rising waveform is different from the falling waveform. In embodiments, the AC component iAC may have any waveform.

Figure 7A:
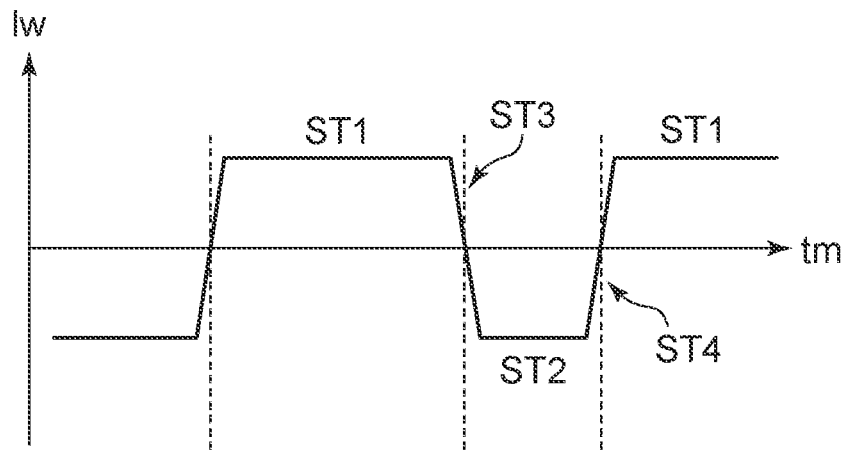
FIGS. 7A and 7B are schematic views illustrating operations of the magnetic recording device according to the first embodiment.
Figure 7B:
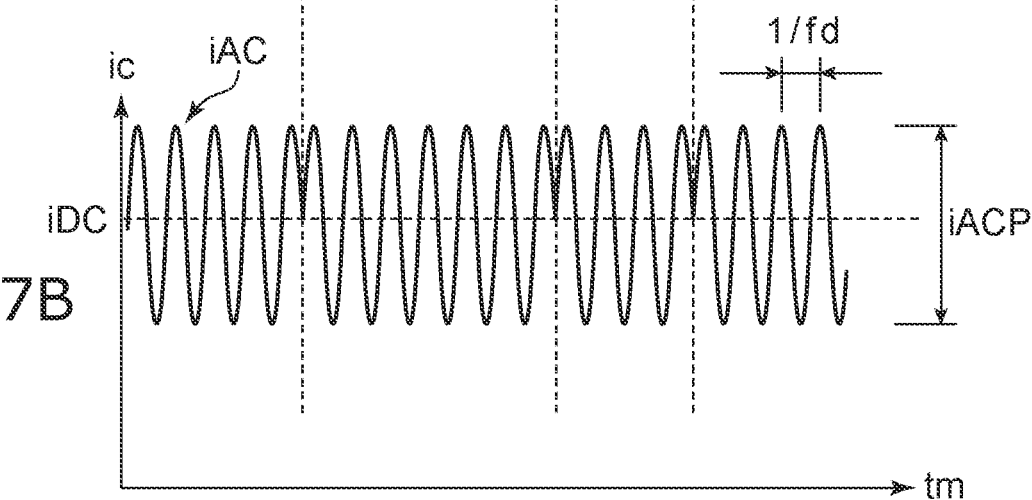

FIGS. 7A and 7B are schematic views illustrating operations of the magnetic recording device according to the first embodiment.

The horizontal axis of these figures is time tm. The vertical axis of FIG. 7A is the recording current Iw. The vertical axis of FIG. 7B is the element current ic.

As shown in FIG. 7A, the recording current Iw includes the first to fourth periods ST1 to ST4. As shown in FIG. 7B, the phase of the AC component iAC of the element current ic is synchronized with the third period ST3 and the fourth period ST4. For example, the phase of the AC component iAC is synchronized at the time when the recording current Iw becomes 0. As described above, in the embodiment, the phase of the AC component iAC may be synchronized with at least one of the third period ST3 or the fourth period ST4. By synchronizing, it is possible to suppress the generation of unnecessary noise at an intended time due to the influence of, for example, coupling. More stable MAMR can be performed.

Figure 8:
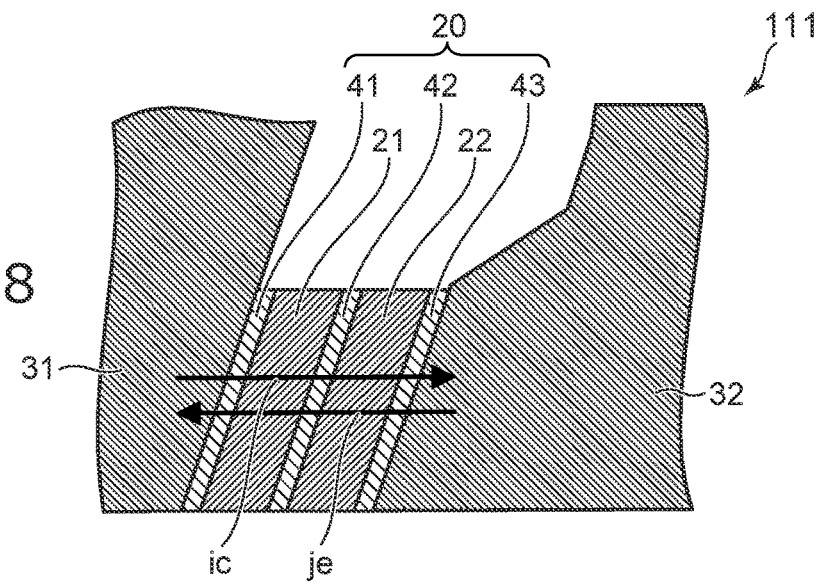
FIG. 8 is a schematic cross-sectional view illustrating a magnetic recording device according to the first embodiment.

FIG. 8 is a schematic cross-sectional view illustrating a magnetic recording device according to the embodiment.

As shown in FIG. 8, in a magnetic head 111 according to the embodiment, the magnetic element 20 includes the first magnetic layer 21, the second magnetic layer 22 provided between the first magnetic layer 21 and the second magnetic pole 32, the first non-magnetic layer 41 provided between the first magnetic pole 31 and the first magnetic layer 21, the second non-magnetic layer 42 provided between the first magnetic layer 21 and the second magnetic layer 22, and a third non-magnetic layer 43 provided between the second magnetic layer 22 and the second magnetic pole 32.

In one example of the magnetic head 111, the first magnetic layer 21 includes at least one selected from the group consisting of Fe, Co and Ni. The second magnetic layer 22 includes at least one selected from the group consisting of Fe, Co and Ni. The first non-magnetic layer 41 includes at least one selected from the group consisting of Cu, Au, Cr, V, Al and Ag, or at least one selected from the group consisting of Ru, Ir, Ta, Rh, Pd, Pt and W. The second non-magnetic layer 42 includes at least one selected from the group consisting of Cu, Au, Cr, V, Al and Ag. The third non-magnetic layer 43 includes at least one selected from the group consisting of Ru, Ir, Ta, Rh, Pd, Pt and W.

In another example of the magnetic head 111, the first magnetic layer 21 includes at least one selected from the group consisting of Fe, Co and Ni. The second magnetic layer 22 includes at least one selected from the group consisting of Fe, Co and Ni, and at least one selected from the group consisting of Cr, V, Mn, Ti and Sc. The first non-magnetic layer 41 includes at least one selected from the group consisting of Cu, Au, Cr, V, Al and Ag, or at last one selected from the group consisting of Ru, Ir, Ta, Rh, Pd, Pt and W. The second non-magnetic layer 42 includes at least one selected from the group consisting of Cu, Au, Cr, V, Al and Ag. The third non-magnetic layer 43 includes at least one selected from the group consisting of Cu, Au, Cr, V, Al and Ag.

Figure 9:
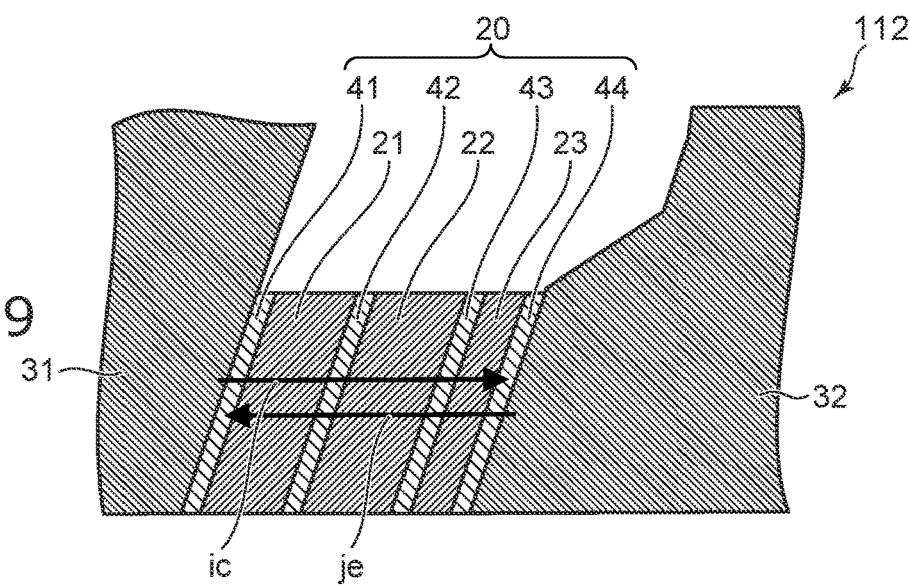
FIG. 9 is a schematic cross-sectional view illustrating a magnetic recording device according to the first embodiment.

FIG. 9 is a schematic cross-sectional view illustrating a magnetic recording device according to the embodiment.

As shown in FIG. 9, in a magnetic head 112 according to the embodiment, the magnetic element 20 includes the first magnetic layer 21, the second magnetic layer 22 provided between the first magnetic layer 21 and the second magnetic pole 32, a third magnetic layer 23 provided between the second magnetic layer 22 and the second magnetic pole 32, the first non-magnetic layer 41 provided between the first magnetic pole 31 and the first magnetic layer 21, the second non-magnetic layer 42 provided between the first magnetic layer 21 and the second magnetic layer 22, the third non-magnetic layer 43 provided between the second magnetic layer 22 and the third magnetic layer 23, and a fourth non-magnetic layer 44 provided between the third magnetic layer 23 and the second magnetic pole 32.

In one example of the magnetic head 112, the first magnetic layer 21 includes at least one selected from the group consisting of Fe, Co and Ni. The second magnetic layer 22 includes at least one selected from the group consisting of Fe, Co and Ni. The third magnetic layer 23 includes at least one selected from the group consisting of Fe, Co and Ni. The first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt and W. The third non-magnetic layer 43 includes at least one selected from the group consisting of Cu, Au, Cr, V, Al and Ag. The fourth non-magnetic layer 44 includes at least one selected from the group consisting of Ru, Ir, Ta, Rh, Pd, Pt and W.

In another example of the magnetic head 112, the first magnetic layer 21 includes at least one selected from the group consisting of Fe, Co and Ni. The second magnetic layer 22 includes at least one selected from the group consisting of Fe, Co and Ni. The third magnetic layer 23 includes at least one selected from the group consisting of Fe, Co and Ni, and at least one selected from the group consisting of Cr, V, Mn, Ti and Sc. The first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt and W. The third non-magnetic layer 43 includes at least one selected from the group consisting of Cu, Au, Cr, V, Al and Ag. The fourth non-magnetic layer 44 includes at least one selected from the group consisting of Cu, Au, Cr, V, Al and Ag.

Figure 10:
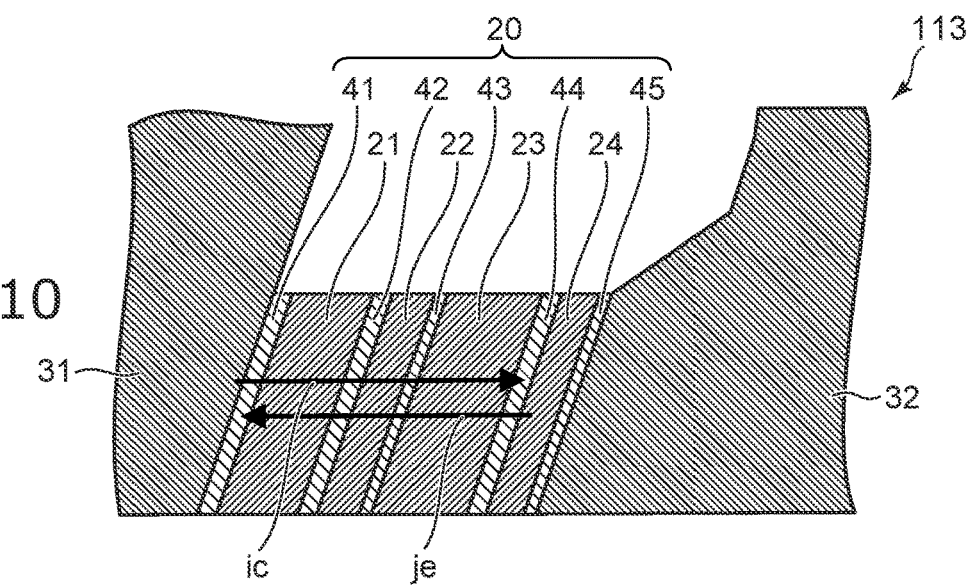
FIG. 10 is a schematic cross-sectional view illustrating a magnetic recording device according to the first embodiment.

FIG. 10 is a schematic cross-sectional view illustrating a magnetic recording device according to the embodiment.

As shown in FIG. 10, in a magnetic head 113 according to the embodiment, the magnetic element 20 includes the first magnetic layer 21, the second magnetic layer 22 provided between the first magnetic layer 21 and the second magnetic pole 32, the third magnetic layer 23 provided between the second magnetic layer 22 and the second magnetic pole 32, the fourth magnetic layer 24 provided between the third magnetic layer 23 and the second magnetic pole 32, the first non-magnetic layer 41 provided between the first magnetic pole 31 and the first magnetic layer 21, the second non-magnetic layer 42 provided between the first magnetic layer 21 and the second magnetic layer 22, the third non-magnetic layer 43 provided between the second magnetic layer 22 and the third magnetic layer 23, the fourth non-magnetic layer 44 provided between the third magnetic layer 23 and the fourth magnetic layer 24, and a fifth non-magnetic layer 45 provided between the fourth magnetic layer 24 and the second magnetic pole 32.

In one example of a magnetic head 113, the first magnetic layer 21 includes at least one selected from the group consisting of Fe, Co and Ni. The second magnetic layer 22 includes at least one selected from the group consisting of Fe, Co and Ni. The third magnetic layer 23 includes at least one selected from the group consisting of Fe, Co and Ni. The fourth magnetic layer 24 includes at least one selected from the group consisting of Fe, Co and Ni. The first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt and W. The third non-magnetic layer 43 includes at least one selected from the group consisting of Cu, Au, Cr, V, Al and Ag. The fourth non-magnetic layer 44 includes at least one selected from the group consisting of Cu, Au, Cr, V, Al and Ag. The fifth non-magnetic layer 45 includes at least one selected from the group consisting of Ru, Ir, Ta, Rh, Pd, Pt and W.

In another example of the magnetic head 113, the first magnetic layer 21 includes at least one selected from the group consisting of Fe, Co and Ni. The second magnetic layer 22 includes at least one selected from the group consisting of Fe, Co and Ni. The third magnetic layer 23 includes at least one selected from the group consisting of Fe, Co and Ni. The fourth magnetic layer 24 includes at least one selected from the group consisting of Fe, Co and Ni. The first non-magnetic layer 41 includes at least one selected from the group consisting of Cu, Au, Cr, V, Al and Ag, or at least one selected from the group consisting of Ru, Ir, Ta, Rh, Pd, Pt and W. The second non-magnetic layer 42 includes at least one selected from the group consisting of Cu, Au, Cr, V, Al and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, V, Al and Ag. The fifth non-magnetic layer 45 includes at least one selected from the group consisting of Ru, Ir, Ta, Rh, Pd, Pt and W.

In another example of the magnetic head 113, the first magnetic layer 21 includes at least one selected from the group consisting of Fe, Co and Ni. The second magnetic layer 22 includes at least one selected from the group consisting of Fe, Co and Ni. The third magnetic layer 23 includes at least one selected from the group consisting of Fe, Co and Ni. The fourth magnetic layer 24 includes at least one selected from the group consisting of Fe, Co and Ni, and at least one selected from the group consisting of Cr, V, Mn, Ti and Sc. The first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt and W. The third non-magnetic layer 43 includes at least one selected from the group consisting of Cu, Au, Cr, V, Al and Ag. The fourth non-magnetic layer 44 includes at least one selected from the group consisting of Cu, Au, Cr, V, Al and Ag. The fifth non-magnetic layer 45 includes at least one selected from the group consisting of Cu, Au, Cr, V, Al and Ag.

In another example of the magnetic head 113, the first magnetic layer 21 includes at least one selected from the group consisting of Fe, Co and Ni. The second magnetic layer 22 includes at least one selected from the group consisting of Fe, Co and Ni. The third magnetic layer 23 includes at least one selected from the group consisting of Fe, Co and Ni. The fourth magnetic layer 24 includes at least one selected from the group consisting of Fe, Co and Ni, and at least one selected from the group consisting of Cr, V, Mn, Ti and Sc. The first non-magnetic layer 41 includes at least one selected from the group consisting of Cu, Au, Cr, V, Al and Ag, or at least one selected from the group consisting of Ru, Ir, Ta, Rh, Pd, Pt and W. The second non-magnetic layer 42 includes at least one selected from the group consisting of Cu, Au, Cr, V, Al and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, V, Al and Ag. The fifth non-magnetic layer 45 includes at least one selected from the group consisting of Cu, Au, Cr, V, Al and Ag.

Figure 11A:
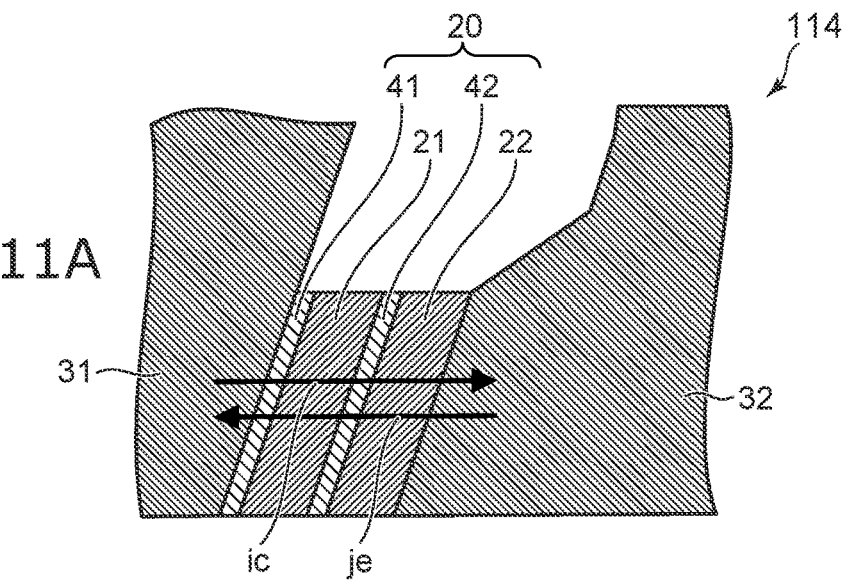
FIGS. 11A to 11C are schematic cross-sectional views illustrating magnetic recording devices according to the embodiment.
Figure 11B:
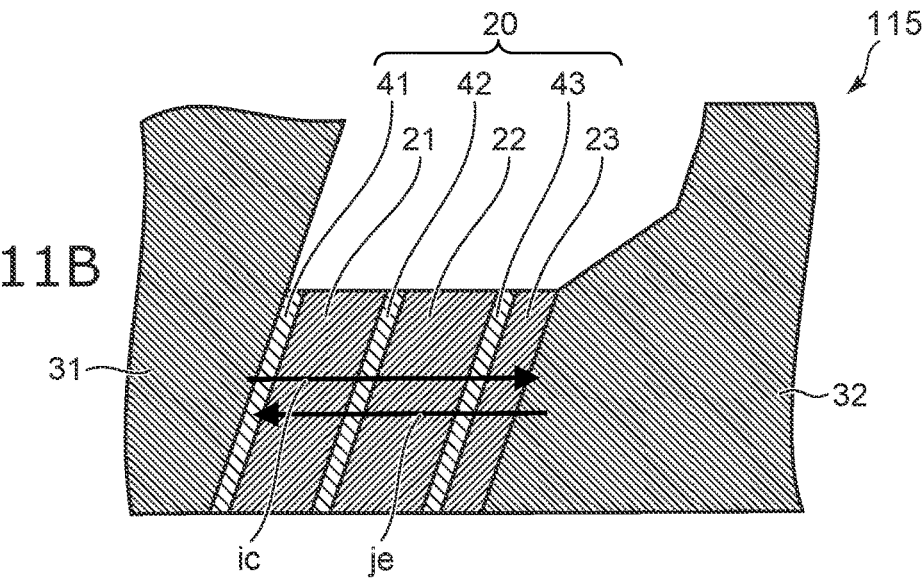
Figure 11C:
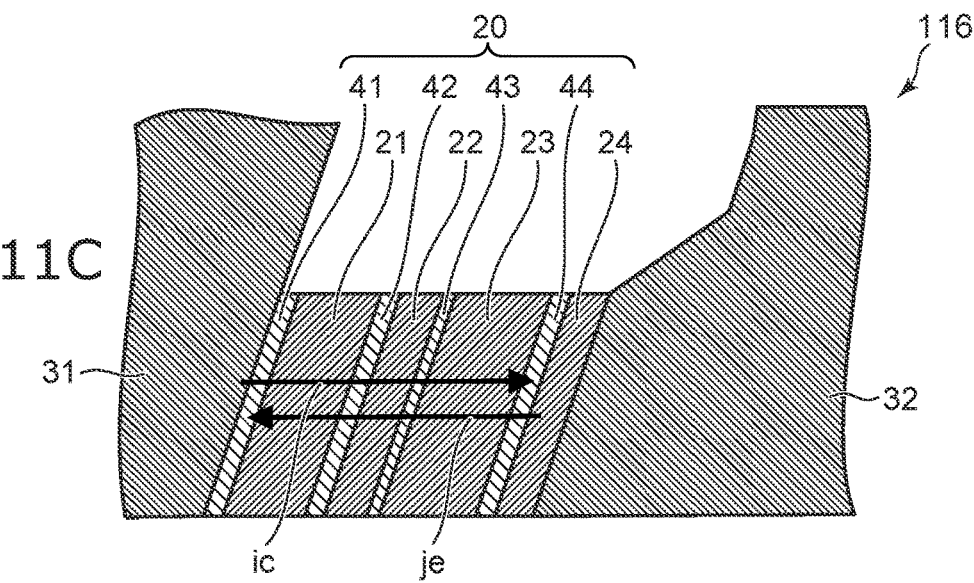

FIGS. 11A to 11C are schematic cross-sectional views illustrating magnetic recording devices according to the embodiment.

As shown in FIG. 11A, in a magnetic head 114 according to the embodiment, the magnetic element 20 includes the first magnetic layer 21, the second magnetic layer 22 provided between the first magnetic layer 21 and the second magnetic pole 32, and being in contact with the second magnetic pole 32, the first non-magnetic layer 41 provided between the first magnetic pole 31 and the first magnetic layer 21, and the second non-magnetic layer 42 provided between the first magnetic layer 21 and the second magnetic layer 22.

In the magnetic head 114, the first magnetic layer 21 includes at least one selected from the group consisting of Fe, Co and Ni. The second magnetic layer 22 includes at least one selected from the group consisting of Fe, Co and Ni, and at least one selected from the group consisting of Cr, V, Mn, Ti and Sc. The first non-magnetic layer 41 includes at least one selected from the group consisting of Cu, Au, Cr, V, Al and Ag, or at least one selected from the group consisting of Ru, Ir, Ta, Rh, Pd, Pt and W. The second non-magnetic layer 42 includes at least one selected from the group consisting of Cu, Au, Cr, V, Al and Ag.

As shown in FIG. 11B, in a magnetic head 115 according to the embodiment, the magnetic element 20 includes the first magnetic layer 21, the second magnetic layer 22 provided between the first magnetic layer 21 and the second magnetic pole 32, the third magnetic layer 23 provided between the second magnetic layer 22 and the second magnetic pole 32 and being in contact with the second magnetic pole 32, the first non-magnetic layer 41 provided between the first magnetic pole 31 and the first magnetic layer 21, the second non-magnetic layer 42 provided between the first magnetic layer 21 and the second magnetic layer 22, and the third non-magnetic layer 43 provided between the second magnetic layer 22 and the third magnetic layer 23.

In the magnetic head 115, the first magnetic layer 21 includes at least one selected from the group consisting of Fe, Co and Ni. The second magnetic layer 22 includes at least one selected from the group consisting of Fe, Co and Ni. The third magnetic layer 23 includes at least one selected from the group consisting of Fe, Co and Ni, and at least one selected from the group consisting of Cr, V, Mn, Ti and Sc. The first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt and W.

The third non-magnetic layer 43 includes at least one selected from the group consisting of Cu, Au, Cr, V, Al and Ag.

As shown in FIG. 11C, in a magnetic head 116 according to the embodiment, the magnetic element 20 includes the first magnetic layer 21, the second magnetic layer 22 provided between the first magnetic layer 21 and the second magnetic pole 32, the third magnetic layer 23 provided between the second magnetic layer 22 and the second magnetic pole 32, the fourth magnetic layer 24 provided between the third magnetic layer 23 and the second magnetic pole 32 and being in contact with the second magnetic pole 32, the first non-magnetic layer 41 provided between the first magnetic pole 31 and the first magnetic layer 21, the second non-magnetic layer 42 provided between the first magnetic layer 21 and the second magnetic layer 22, the third non-magnetic layer 43 provided between the second magnetic layer 22 and the third magnetic layer 23, and the fourth non-magnetic layer 44 provided between the third magnetic layer 23 and the fourth magnetic layer 24.

In one example of the magnetic head 116, the first magnetic layer 21 includes at least one selected from the group consisting of Fe, Co and Ni. The second magnetic layer 22 includes at least one selected from the group consisting of Fe, Co and Ni. The third magnetic layer 23 includes at least one selected from the group consisting of Fe, Co and Ni. The fourth magnetic layer 24 includes at least one selected from the group consisting of Fe, Co and Ni, and at least one selected from the group consisting of Cr, V, Mn, Ti and Sc. The first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt and W. The third non-magnetic layer 43 includes at least one selected from the group consisting of Cu, Au, Cr, V, Al and Ag. The fourth non-magnetic layer 44 includes at least one selected from the group consisting of Cu, Au, Cr, V, Al and Ag.

In the magnetic head 116, the first magnetic layer 21 includes at least one selected from the group consisting of Fe, Co and Ni. The second magnetic layer 22 includes at least one selected from the group consisting of Fe, Co and Ni. The third magnetic layer 23 includes at least one selected from the group consisting of Fe, Co and Ni. The fourth magnetic layer 24 includes at least one selected from the group consisting of Fe, Co and Ni, and at least one selected from the group consisting of Cr, V, Mn, Ti and Sc. The first non-magnetic layer 41 includes at least one selected from the group consisting of Cu, Au, Cr, V, Al and Ag, or at least one selected from the group consisting of Ru, Ir, Ta, Rh, Pd, Pt and W. The second non-magnetic layer 42 includes at least one selected from the group consisting of Cu, Au, Cr, V, Al and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, V, Al and Ag.

In the various magnetic heads described above, when the magnetic layer includes at least one selected from the group consisting of Cr, V, Mn, Ti and Sc, the magnetic layer has negative spin polarization. When the magnetic layer does not substantially include at least one selected from the group consisting of Cr, V, Mn, Ti and Sc, the magnetic layer has positive spin polarization.

Figure 12:
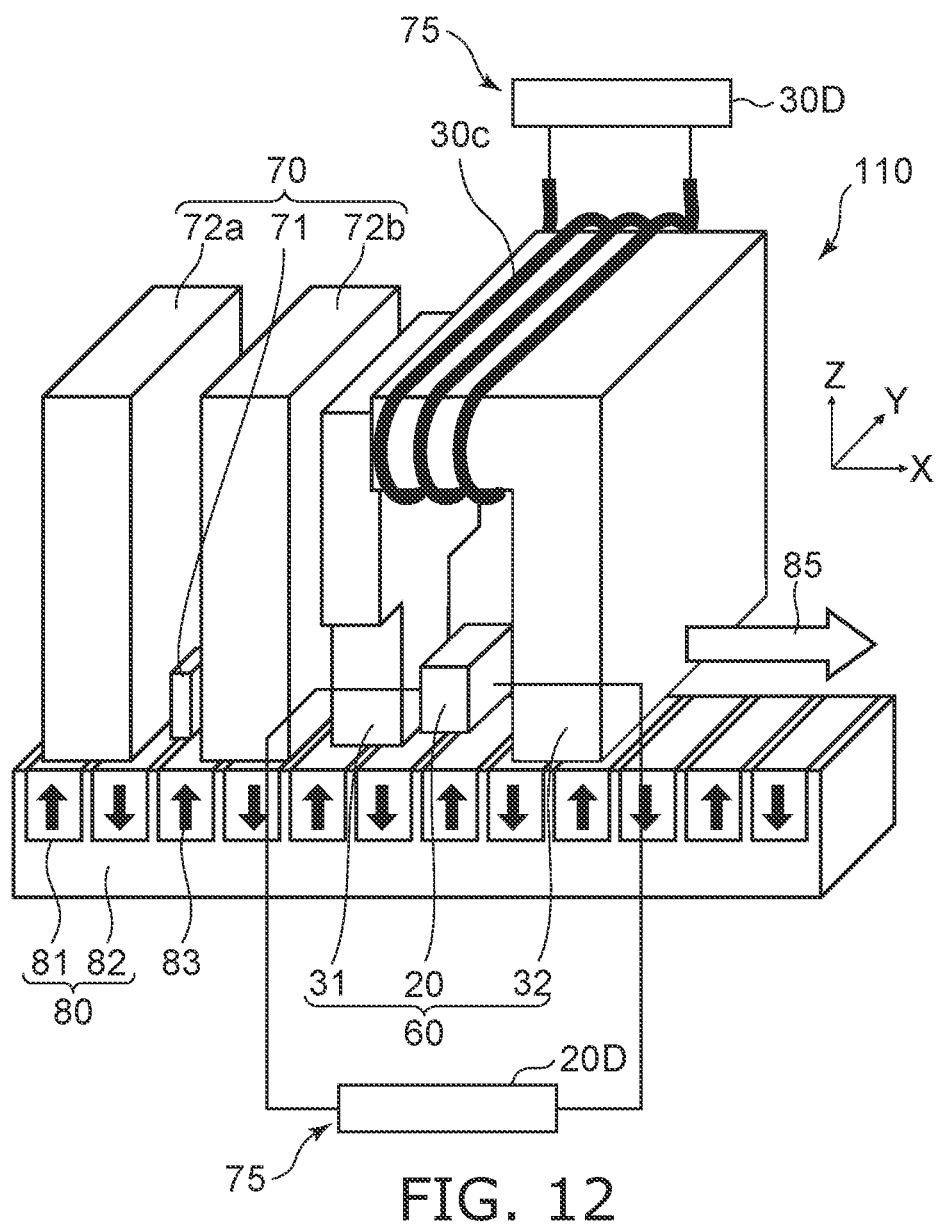
FIG. 12 is a schematic perspective view illustrating the magnetic recording device according to the embodiment.

FIG. 12 is a schematic perspective view illustrating the magnetic recording device according to the embodiment.

As shown in FIG. 12, the magnetic head according to the embodiment (for example, magnetic head 110) is used together with the magnetic recording medium 80. In this example, the magnetic head 110 includes the recording part 60 and the reproducing part 70. Information is recorded on the magnetic recording medium 80 by the recording part 60 of the magnetic head 110. The reproducing part 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording part 60.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 can output a signal corresponding to the magnetization 83 of the magnetic recording layer 81.

As shown in FIG. 12, the magnetic recording medium 80 moves relative to the magnetic head 110 in a direction of a medium movement direction 85. The magnetic head 110 controls the information corresponding to the magnetization 83 of the magnetic recording layer 81 at an arbitrary position. The magnetic head 110 reproduces the information corresponding to the magnetization 83 of the magnetic recording layer 81 at an arbitrary position.

As shown in FIG. 12, the coil 30c may be provided around the second magnetic pole 32. The second magnetic pole 32 forms a magnetic circuit together with the first magnetic pole 31. The first magnetic pole 31 and the second magnetic pole 32 are magnetically excited by the coil 30c. As described with respect to FIG. 1A, the coil 30c may be provided around the first magnetic pole 31.

Figure 13:
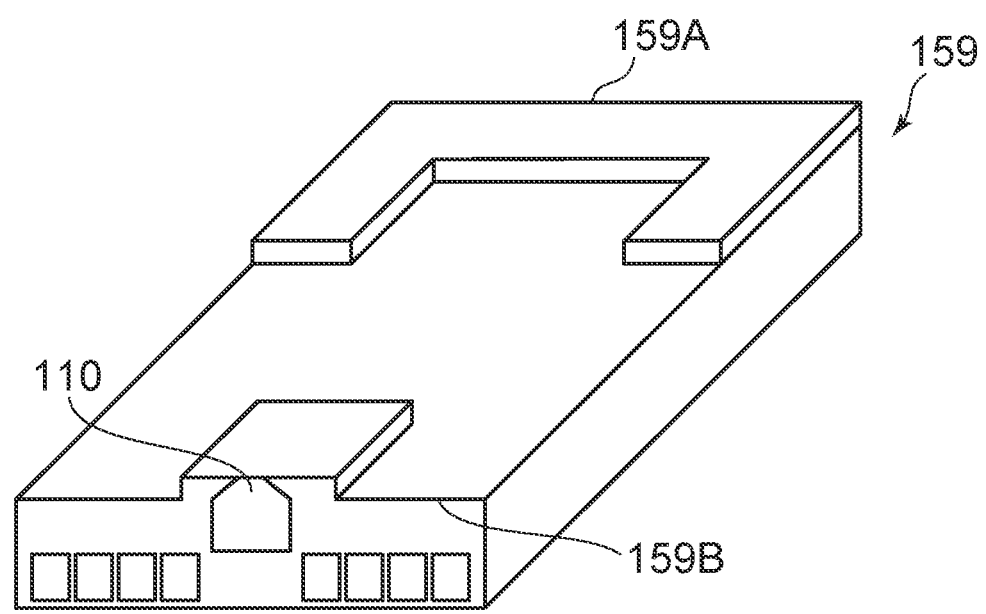
FIG. 13 is a schematic perspective view illustrating a part of the magnetic recording device according to the embodiment.

FIG. 13 is a schematic perspective view illustrating a part of the magnetic recording device according to the embodiment.

FIG. 13 illustrates a head slider.

The magnetic head 110 is provided on the head slider 159. The head slider 159 includes, for example, $Al_2O_3$/TiC and the like. The head slider 159 moves relative to the magnetic recording medium while floating or contacting the magnetic recording medium.

The head slider 159 has, for example, an air inflow side 159A and an air outflow side 159B. The magnetic head 110 is provided on a side surface of the air outflow side 159B of the head slider 159. As a result, the magnetic head 110 moves relative to the magnetic recording medium while floating or contacting the magnetic recording medium.

Figure 14:
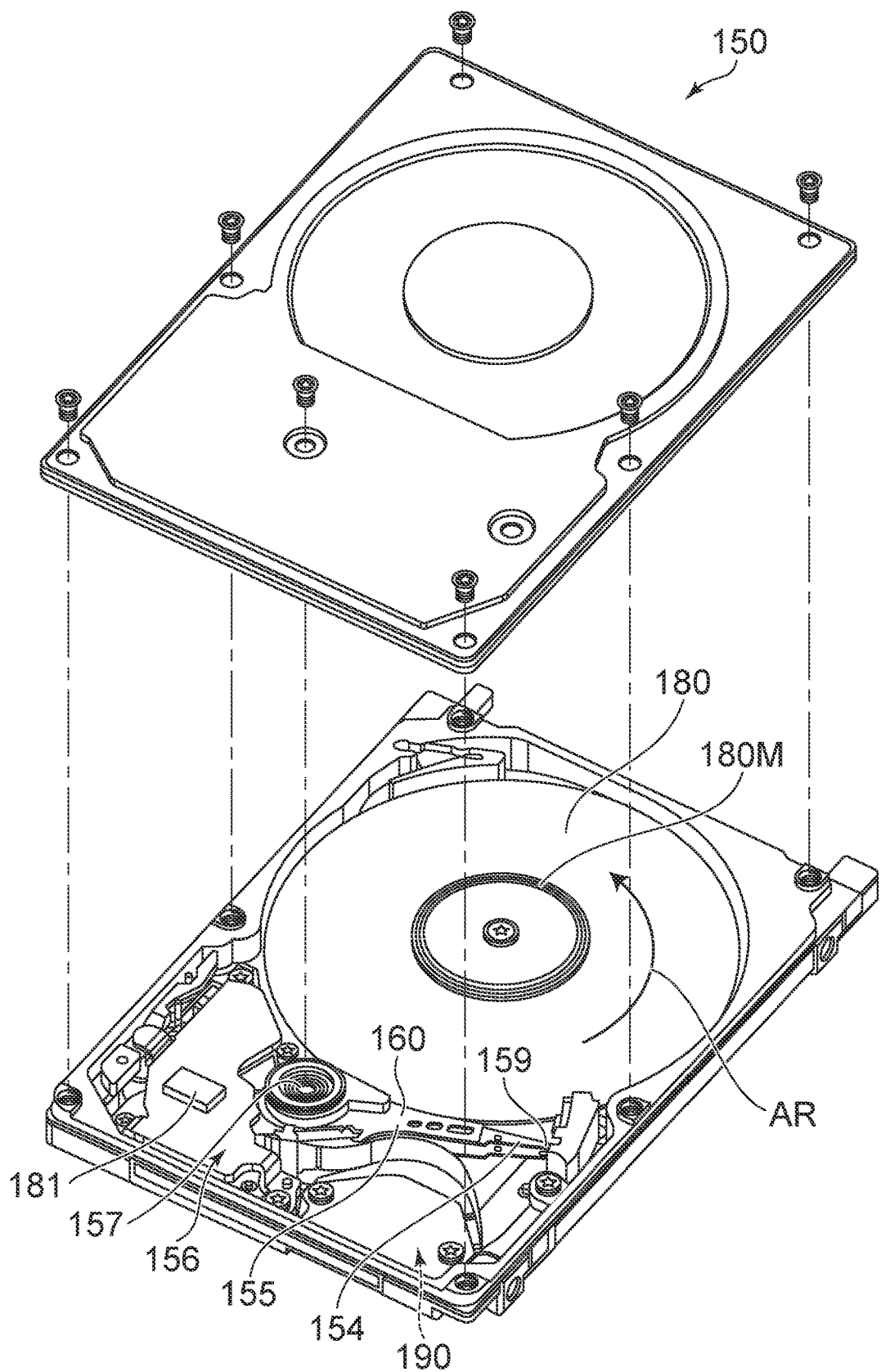
FIG. 14 is a schematic perspective view illustrating the magnetic recording device according to the embodiment.

FIG. 14 is a schematic perspective view illustrating the magnetic recording device according to the embodiment.

Figure 15A:
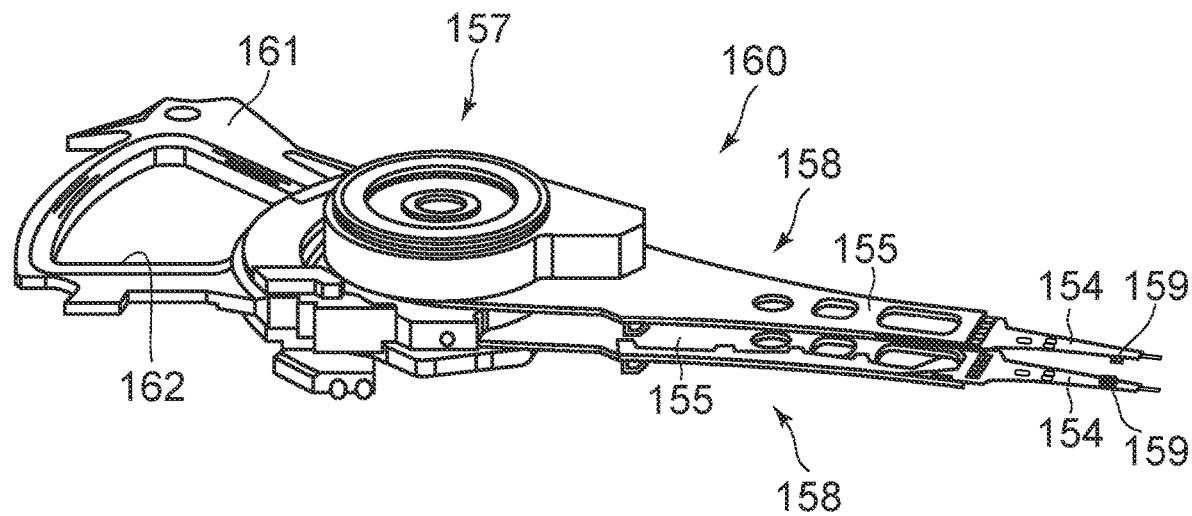
FIGS. 15A and 15B are schematic perspective views illustrating a part of the magnetic recording device according to the embodiment.
Figure 15B:
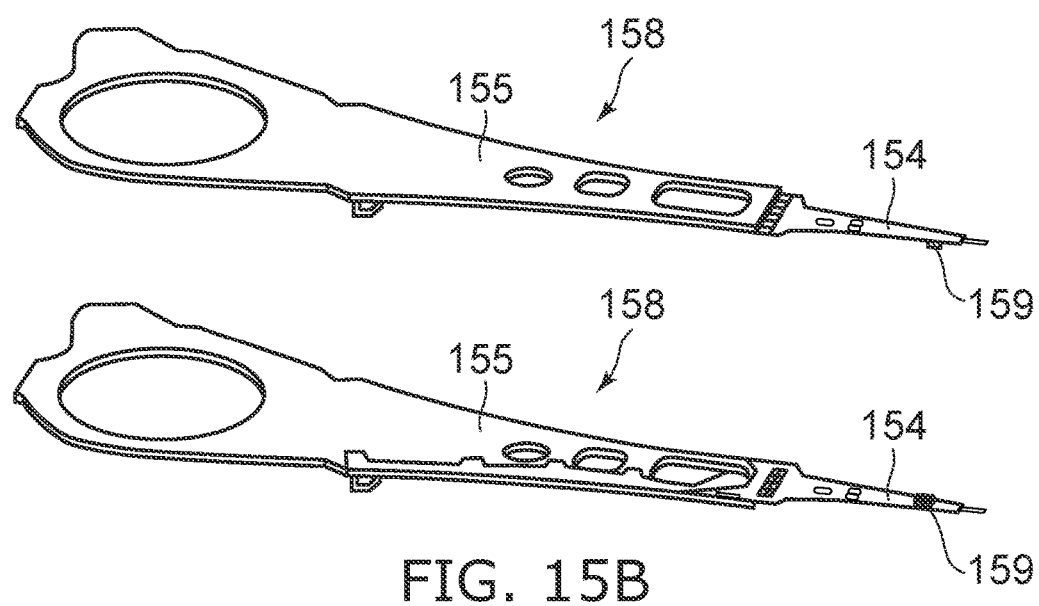

FIGS. 15A and 15B are schematic perspective views illustrating a part of the magnetic recording device according to the embodiment.

As shown in FIG. 14, in the magnetic recording and reproducing device 150 according to the embodiment, a rotary actuator is used. The recording medium disk 180 is mounted on a spindle motor 180M. The recording medium disk 180 is rotated in the direction of the arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of the thin film suspension 154. The magnetic head according to the embodiment is provided near the tip of the head slider 159.

When the recording medium disk 180 rotates, the downward pressure due to the suspension 154 and the pressure generated on the medium-facing surface (ABS) of the head slider 159 are balanced. The distance between the medium-facing surface of the head slider 159 and the surface of the recording medium disk 180 is a predetermined fly height. In the embodiment, the head slider 159 may be in contact with the recording medium disk 180. For example, a contact-sliding type may be applied.

The suspension 154 is connected to one end of the arm 155 (for example, an actuator arm). The arm 155 includes, for example, a bobbin part and the like. The bobbin part holds the drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin part of the arm 155. The magnetic circuit includes a permanent magnet and an opposing yoke. The drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

FIG. 15A illustrates the configuration of a part of the magnetic recording device and is an enlarged perspective view of a head stack assembly 160.

FIG. 15B is a perspective view illustrating a magnetic head assembly (head gimbal assembly: HGA) 158 that is a part of the head stack assembly 160.

As shown in FIG. 15A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 15B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, a lead wire (not shown) for recording and reproducing a signal. The suspension 154 may include, for example, a lead wire (not shown) for a heater for adjusting the fly height. The suspension 154 may include a lead wire (not shown) for, for example, a spin transfer torque oscillator. These lead wires and multiple electrodes provided on the magnetic head are electrically connected.

The signal processor 190 is provided in the magnetic recording device 150. The signal processor 190 records and reproduces the signal on the magnetic recording medium using the magnetic head. In the signal processor 190, the input/output lines of the signal processor 190 are connected to, for example, the electrode pads of the head gimbal assembly 158, and electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces the signal on the magnetic recording medium using the magnetic head.

For example, the recording medium disk 180 is used as the above magnetic recording medium. The movable part includes, for example, the head slider 159. The position controller includes, for example, the head gimbal assembly 158.

The embodiment may include the following configuration (for example, a technical proposal).

Configuration 1

A magnetic recording device, comprising:

a magnetic head including a first magnetic pole, a magnetic element including a first magnetic layer, and a coil; and a controller electrically connected to the magnetic element and the coil, the controller being configured to supply a recording current to the coil and supply an element current to the magnetic element, the recording current including a first period of a first polarity, a second period of a second polarity different from the first polarity, a third period that shifts from the first period to the second period, and a fourth period that shifts from the second period to the first period, and the element current including a DC component and an AC component, the AC component in the first period being same as the AC component in the second period, the AC component in the third period, and the AC component in the fourth period.

Configuration 2

The magnetic recording device according to Configuration 1, wherein a ratio of an amplitude of the AC component to an absolute value of the DC component is not less than 0.1.

Configuration 3

The magnetic recording device according to Configuration 1, wherein a ratio of an amplitude of the AC component to an absolute value of the DC component is not less than 0.5.

Configuration 4

The magnetic recording device according to any one of Configurations 1 to 3, wherein a frequency of the AC component is not less than 0.2 GHz and not more than 7 GHz.

Configuration 5

The magnetic recording device according to any one of Configurations 1 to 3, further comprising:

a magnetic recording medium, a frequency of the AC component is not more than 1/5 of a frequency at which strength of an alternating magnetic field generated from the magnetic element is highest when the element current does not include the AC component.

Configuration 6

The magnetic recording device according to any one of Configurations 1 to 3, wherein a current density of the element current in the magnetic element is not more than $5 \times 10^8$ A/cm$^2$.

Configuration 7

The magnetic recording device according to any one of Configurations 1 to 6, wherein a phase of the AC component is synchronized with at least one of the third period or the fourth period.

Configuration 8

The magnetic recording device according to any one of Configurations 1 to 7, wherein the magnetic element generates an alternating magnetic field.

Configuration 9

The magnetic recording device according to any one of Configurations 1 to 8, wherein the magnetic head further includes a second magnetic pole, and the magnetic element is provided between the first magnetic pole and the second magnetic pole.

Configuration 10

The magnetic recording device according to Configuration 9, wherein the magnetic element further includes a first non-magnetic layer provided between the first magnetic pole and the first magnetic layer, and a second non-magnetic layer provided between the first magnetic layer and the second magnetic pole, the first magnetic layer includes at least one selected from the group consisting of Fe, Co and Ni, the first non-magnetic layer includes at least one selected from the group consisting of Cu, Au, Cr, V, Al and Ag, and the second non-magnetic layer includes at least one selected from the group consisting of Ru, Ir, Ta, Rh, Pd, Pt and W.

Configuration 11

The magnetic recording device according to Configuration 9, wherein the magnetic element further includes a second magnetic layer provided between the first magnetic layer and the second magnetic pole, a first non-magnetic layer provided between the first magnetic pole and the first magnetic layer, a second non-magnetic layer provided between the first magnetic layer and the second magnetic layer, and a third non-magnetic layer provided between the second magnetic layer and the second magnetic pole, the first magnetic layer includes at least one selected from the group consisting of Fe, Co and Ni, the second magnetic layer includes at least one selected from the group consisting of Fe, Co and Ni, the first non-magnetic layer includes at least one selected from the group consisting of Cu, Au, Cr, V, Al and Ag, or at least one selected from the group consisting of Ru, Ir, Ta, Rh, Pd, Pt and W, the second non-magnetic layer includes at least one selected from the group consisting of Cu, Au, Cr, V, Al and Ag, and the third non-magnetic layer includes at least one selected from the group consisting of Ru, Ir, Ta, Rh, Pd, Pt and W.

Configuration 12

The magnetic recording device according to Configuration 9, wherein the magnetic element further includes a second magnetic layer provided between the first magnetic layer and the second magnetic pole, a first non-magnetic layer provided between the first magnetic pole and the first magnetic layer, a second non-magnetic layer provided between the first magnetic layer and the second magnetic layer, and a third non-magnetic layer provided between the second magnetic layer and the second magnetic pole, the first magnetic layer includes at least one selected from the group consisting of Fe, Co and Ni, the second magnetic layer includes at least one selected from the group consisting of Fe, Co and Ni, and at least one selected from the group consisting of Cr, V, Mn, Ti and Sc, the first non-magnetic layer includes at least one selected from the group consisting of Cu, Au, Cr, V, Al and Ag, or at least one selected from the group consisting of Ru, Ir, Ta, Rh, Pd, Pt and W, the second non-magnetic layer includes at least one selected from the group consisting of Cu, Au, Cr, V, Al and Ag, and the third non-magnetic layer includes at least one selected from the group consisting of Cu, Au, Cr, V, Al and Ag.

Configuration 13

The magnetic recording device according to Configuration 9, wherein the magnetic element further includes a second magnetic layer provided between the first magnetic layer and the second magnetic pole, a third magnetic layer provided between the second magnetic layer and the second magnetic pole, a first non-magnetic layer provided between the first magnetic pole and the first magnetic layer, a second non-magnetic layer provided between the first magnetic layer and the second magnetic layer, a third non-magnetic layer provided between the second magnetic layer and the third magnetic layer, and a fourth non-magnetic layer provided between the third magnetic layer and the second magnetic pole, the first magnetic layer includes at least one selected from the group consisting of Fe, Co and Ni, the second magnetic layer includes at least one selected from the group consisting of Fe, Co and Ni, the third magnetic layer includes at least one selected from the group consisting of Fe, Co and Ni, the first non-magnetic layer includes at least one selected from the group consisting of Cu, Au, Cr, V, Al and Ag, the second non-magnetic layer includes at least one selected from the group consisting of Ru, Ir, Ta, Rh, Pd, Pt and W, the third non-magnetic layer includes at least one selected from the group consisting of Cu, Au, Cr, V, Al and Ag, and the fourth non-magnetic layer includes at least one selected from the group consisting of Ru, Ir, Ta, Rh, Pd, Pt and W.

Configuration 14

The magnetic recording device according to Configuration 9, wherein
the magnetic element further includes
a second magnetic layer provided between the first magnetic layer and the second magnetic pole,
a third magnetic layer provided between the second magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer, and
a fourth non-magnetic layer provided between the third magnetic layer and the second magnetic pole,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni, and at least one selected from the group consisting of Cr, V, Mn, Ti and Sc,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt and W,
the third non-magnetic layer includes at least one selected from the group consisting of Cu, Au, Cr, V, Al and Ag, and
the fourth non-magnetic layer includes at least one selected from the group consisting of Cu, Au, Cr, V, Al and Ag.

Configuration 15

The magnetic recording device according to Configuration 9, wherein
the magnetic element further includes
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni,
the fourth magnetic layer includes at least one selected from the group consisting of Fe, Co and Ni,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt and W,
the third non-magnetic layer includes at least one selected from the group consisting of Cu, Au, Cr, V, Al and Ag,
the fourth non-magnetic layer includes at least one selected from the group consisting of Cu, Au, Cr, V, Al and Ag,
the fifth non-magnetic layer includes at least one selected from the group consisting of Ru, Ir, Ta, Rh, Pd, Pt and W.

Configuration 16

The magnetic recording device according to Configuration 9, wherein
the magnetic element further includes
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni,
the fourth magnetic layer includes at least one selected from the group consisting of Fe, Co and Ni,
the first non-magnetic layer includes at least one selected from the group consisting of Cu, Au, Cr, V, Al and Ag, or at least one selected from the group consisting of Ru, Ir, Ta, Rh, Pd, Pt and w,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt and W,
the fourth non-magnetic layer includes at least one selected from the group consisting of Cu, Au, Cr, V, Al and Ag, and
the fifth non-magnetic layer includes at least one selected from the group consisting of Ru, Ir, Ta, Rh, Pd, Pt and W.

Configuration 17

The magnetic recording device according to Configuration 9, wherein
the magnetic element further includes
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and a fifth non-magnetic layer provided between the fourth magnetic layer and the second magnetic pole, the first magnetic layer includes at least one selected from the group consisting of Fe, Co and Ni, the second magnetic layer includes at least one selected from the group consisting of Fe, Co and Ni, the third magnetic layer includes at least one selected from the group consisting of Fe, Co and Ni, the fourth magnetic layer includes at least one selected from the group consisting of Fe, Co and Ni, and at least one selected from the group consisting of Cr, V, Mn, Ti and Sc, the first non-magnetic layer includes at least one selected from the group consisting of Cu, Au, Cr, V, Al and Ag, the second non-magnetic layer includes at least one selected from the group consisting of Ru, Ir, Ta, Rh, Pd, Pt and W, the third non-magnetic layer includes at least one selected from the group consisting of Cu, Au, Cr, V, Al and Ag, the fourth non-magnetic layer includes at least one selected from the group consisting of Cu, Au, Cr, V, Al and Ag, and the fifth non-magnetic layer includes at least one selected from the group consisting of Cu, Au, Cr, V, Al and Ag.

Configuration 18

The magnetic recording device according to Configuration 9, wherein the magnetic element further includes a second magnetic layer provided between the first magnetic layer and the second magnetic pole, a third magnetic layer provided between the second magnetic layer and the second magnetic pole, a fourth magnetic layer provided between the third magnetic layer and the second magnetic pole, a first non-magnetic layer provided between the first magnetic pole and the first magnetic layer, a second non-magnetic layer provided between the first magnetic layer and the second magnetic layer, a third non-magnetic layer provided between the second magnetic layer and the third magnetic layer, a fourth non-magnetic layer provided between the third magnetic layer and the fourth magnetic layer, and a fifth non-magnetic layer provided between the fourth magnetic layer and the second magnetic pole, the first magnetic layer includes at least one selected from the group consisting of Fe, Co and Ni, the second magnetic layer includes at least one selected from the group consisting of Fe, Co and Ni, the third magnetic layer includes at least one selected from the group consisting of Fe, Co and Ni, the fourth magnetic layer includes at least one selected from the group consisting of Fe, Co and Ni, and at least one selected from the group consisting of Cr, V, Mn, Ti and Sc, the first non-magnetic layer includes at least one selected from the group consisting of Cu, Au, Cr, V, Al and Ag, or at least one selected from the group consisting of Ru, Ir, Ta, Rh, Pd, Pt and W, the second non-magnetic layer includes at least one selected from the group consisting of Cu, Au, Cr, V, Al and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, V, Al and Ag, and the fifth non-magnetic layer includes at least one selected from the group consisting of Cu, Au, Cr, V, Al and Ag.

Configuration 19

The magnetic recording device according to Configuration 9, wherein the magnetic element further includes a second magnetic layer provided between the first magnetic layer and the second magnetic pole and in contact with the second magnetic pole, a first non-magnetic layer provided between the first magnetic pole and the first magnetic layer, and a second non-magnetic layer provided between the first magnetic layer and the second magnetic layer, the first magnetic layer includes at least one selected from the group consisting of Fe, Co and Ni, the second magnetic layer includes at least one selected from the group consisting of Fe, Co and Ni, and at least one selected from the group consisting of Cr, V, Mn, Ti and Sc, the first non-magnetic layer includes at least one selected from the group consisting of Cu, Au, Cr, V, Al and Ag, or at least one selected from the group consisting of Ru, Ir, Ta, Rh, Pd, Pt and W, and the second non-magnetic layer includes at least one selected from the group consisting of Cu, Au, Cr, V, Al and Ag.

Configuration 20

The magnetic recording device according to Configuration 9, wherein the magnetic element further includes a second magnetic layer provided between the first magnetic layer and the second magnetic pole, a third magnetic layer provided between the second magnetic layer and the second magnetic pole and in contact with the second magnetic pole, a first non-magnetic layer provided between the first magnetic pole and the first magnetic layer, a second non-magnetic layer provided between the first magnetic layer and the second magnetic layer, and a third non-magnetic layer provided between the second magnetic layer and the third magnetic layer, the first magnetic layer includes at least one selected from the group consisting of Fe, Co and Ni, the second magnetic layer includes at least one selected from the group consisting of Fe, Co and Ni, the third magnetic layer includes at least one selected from the group consisting of Fe, Co and Ni, and at least one selected from the group consisting of Cr, V, Mn, Ti and Sc, the first non-magnetic layer includes at least one selected from the group consisting of Cu, Au, Cr, V, Al and Ag, the second non-magnetic layer includes at least one selected from the group consisting of Ru, Ir, Ta, Rh, Pd, Pt and W, and the third non-magnetic layer includes at least one selected from the group consisting of Cu, Au, Cr, V, Al and Ag.

Configuration 21

The magnetic recording device according to Configuration 9, wherein the magnetic element further includes a second magnetic layer provided between the first magnetic layer and the second magnetic pole, a third magnetic layer provided between the second magnetic layer and the second magnetic pole, a fourth magnetic layer provided between the third magnetic layer and the second magnetic pole and in contact with the second magnetic pole, a first non-magnetic layer provided between the first magnetic pole and the first magnetic layer, a second non-magnetic layer provided between the first magnetic layer and the second magnetic layer, a third non-magnetic layer provided between the second magnetic layer and the third magnetic layer, and
a fourth non-magnetic layer provided between the third magnetic layer and the fourth magnetic layer,
the first magnetic layer includes at least one selected from the group consisting of Fe, Co and Ni,
The second magnetic layer includes at least one selected from the group consisting of Fe, Co and Ni,
the third magnetic layer includes at least one selected from the group consisting of Fe, Co and Ni,
the fourth magnetic layer includes at least one selected from the group consisting of Fe, Co and Ni, and at least one selected from the group consisting of Cr, V, Mn, Ti and Sc,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt and W,
the third non-magnetic layer includes at least one selected from the group consisting of Cu, Au, Cr, V, Al and Ag, and
the fourth non-magnetic layer includes at least one selected from the group consisting of Cu, Au, Cr, V, Al and Ag.

Configuration 22

The magnetic recording device according to Configuration 9, wherein
the magnetic element further includes
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole and in contact with the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer, and
a fourth non-magnetic layer provided between the third magnetic layer and the fourth magnetic layer,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni,
the fourth magnetic layer includes at least one selected from the group consisting of Fe, Co and Ni, and at least one selected from the group consisting of Cr, V, Mn, Ti and Sc,
the first non-magnetic layer includes at least one selected from the group consisting of Cu, Au, Cr, V, Al and Ag, or at least one selected from the group consisting of Ru, Ir, Ta, Rh, Pd, Pt and W,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt and W, and
the fourth non-magnetic layer includes at least one selected from the group consisting of Cu, Au, Cr, V, Al and Ag.

Configuration 23

The magnetic head according to any one of Configurations 10 to 22, wherein
the DC component has an orientation from the first magnetic pole to the second magnetic pole.

According to the embodiment, a magnetic recording device capable of improving a recording density can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as magnetic poles, magnetic elements, magnetic layers, non-magnetic layers, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices practicable by an appropriate design modification by one skilled in the art based on the magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
a magnetic head including a first magnetic pole, a magnetic element including a first magnetic layer, and a coil; and
a controller electrically connected to the magnetic element and the coil, the controller being configured to supply a recording current to the coil and supply an element current to the magnetic element,
the recording current including a first period of a first polarity, a second period of a second polarity different from the first polarity, a third period that shifts from the first period to the second period, and a fourth period that shifts from the second period to the first period, and
the element current including a DC component and an AC component, the AC component in the first period being same as the AC component in the second period, the AC component in the third period, and the AC component in the fourth period, wherein
a frequency of the AC component is not less than 0.2 GHz and not more than 7 GHz.

2. The device according to claim 1, wherein
a ratio of an amplitude of the AC component to an absolute value of the DC component is not less than 0.1.

3. The device according to claim 1, wherein
a ratio of an amplitude of the AC component to an absolute value of the DC component is not less than 0.5.

4. The device according to claim 1, further comprising:
a magnetic recording medium,
a frequency of the AC component is not more than ⅕ of a frequency at which strength of an alternating magnetic field generated from the magnetic element is highest when the element current does not include the AC component.

5. The device according to claim 1, wherein
a current density of the element current in the magnetic element is not more than $5 \times 10^8$ A/cm$^2$.

6. The device according to claim 1, wherein
a phase of the AC component is synchronized with at least one of the third period or the fourth period.

7. The device according to claim 1, wherein
the magnetic element generates an alternating magnetic field.

8. The device according to claim 1, wherein
the magnetic head further includes a second magnetic pole, and
the magnetic element is provided between the first magnetic pole and the second magnetic pole.

9. The device according to claim 8, wherein
the magnetic element further includes
  a first non-magnetic layer provided between the first magnetic pole and the first magnetic layer, and
  a second non-magnetic layer provided between the first magnetic layer and the second magnetic pole,
the first magnetic layer includes at least one selected from the group consisting of Fe, Co and Ni,
the first non-magnetic layer includes at least one selected from the group consisting of Cu, Au, Cr, V, Al and Ag, and
the second non-magnetic layer includes at least one selected from the group consisting of Ru, Ir, Ta, Rh, Pd, Pt and W.

10. The device according to claim 8, wherein
the magnetic element further includes
  a second magnetic layer provided between the first magnetic layer and the second magnetic pole,
  a first non-magnetic layer provided between the first magnetic pole and the first magnetic layer,
  a second non-magnetic layer provided between the first magnetic layer and the second magnetic layer, and
  a third non-magnetic layer provided between the second magnetic layer and the second magnetic pole,
the first magnetic layer includes at least one selected from the group consisting of Fe, Co and Ni,
the second magnetic layer includes at least one selected from the group consisting of Fe, Co and Ni,
the first non-magnetic layer includes at least one selected from the group consisting of Cu, Au, Cr, V, Al and Ag, or at least one selected from the group consisting of Ru, Ir, Ta, Rh, Pd, Pt and W,
the second non-magnetic layer includes at least one selected from the group consisting of Cu, Au, Cr, V, Al and Ag, and
the third non-magnetic layer includes at least one selected from the group consisting of Ru, Ir, Ta, Rh, Pd, Pt and W.

11. The device according to claim 8, wherein
the magnetic element further includes
  a second magnetic layer provided between the first magnetic layer and the second magnetic pole,
  a first non-magnetic layer provided between the first magnetic pole and the first magnetic layer,
  a second non-magnetic layer provided between the first magnetic layer and the second magnetic layer, and
  a third non-magnetic layer provided between the second magnetic layer and the second magnetic pole,
the first magnetic layer includes at least one selected from the group consisting of Fe, Co and Ni,
the second magnetic layer includes at least one selected from the group consisting of Fe, Co and Ni, and at least one selected from the group consisting of Cr, V, Mn, Ti and Sc,
the first non-magnetic layer includes at least one selected from the group consisting of Cu, Au, Cr, V, Al and Ag, or at least one selected from the group consisting of Ru, Ir, Ta, Rh, Pd, Pt and W,
the second non-magnetic layer includes at least one selected from the group consisting of Cu, Au, Cr, V, Al and Ag, and
the third non-magnetic layer includes at least one selected from the group consisting of Cu, Au, Cr, V, Al and Ag.

12. The device according to claim 8, wherein
the magnetic element further includes
  a second magnetic layer provided between the first magnetic layer and the second magnetic pole,
  a third magnetic layer provided between the second magnetic layer and the second magnetic pole,
  a first non-magnetic layer provided between the first magnetic pole and the first magnetic layer,
  a second non-magnetic layer provided between the first magnetic layer and the second magnetic layer,
  a third non-magnetic layer provided between the second magnetic layer and the third magnetic layer, and
  a fourth non-magnetic layer provided between the third magnetic layer and the second magnetic pole,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt and W,
the third non-magnetic layer includes at least one selected from the group consisting of Cu, Au, Cr, V, Al and Ag, and
the fourth non-magnetic layer includes at least one selected from the group consisting of Ru, Ir, Ta, Rh, Pd, Pt and W.

13. The device according to claim 8, wherein
the magnetic element further includes
  a second magnetic layer provided between the first magnetic layer and the second magnetic pole, a third magnetic layer provided between the second magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer, and
a fourth non-magnetic layer provided between the third magnetic layer and the second magnetic pole,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni, and at least one selected from the group consisting of Cr, V, Mn, Ti and Sc,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt and W,
the third non-magnetic layer includes at least one selected from the group consisting of Cu, Au, Cr, V, Al and Ag, and
the fourth non-magnetic layer includes at least one selected from the group consisting of Cu, Au, Cr, V, Al and Ag.

14. The device according to claim 8, wherein
the magnetic element further includes
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni,
the fourth magnetic layer includes at least one selected from the group consisting of Fe, Co and Ni,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt and W,
the third non-magnetic layer includes at least one selected from the group consisting of Cu, Au, Cr, V, Al and Ag,
the fourth non-magnetic layer includes at least one selected from the group consisting of Cu, Au, Cr, V, Al and Ag,
the fifth non-magnetic layer includes at least one selected from the group consisting of Ru, Ir, Ta, Rh, Pd, Pt and W.

15. The device according to claim 8, wherein
the magnetic element further includes
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni,
the fourth magnetic layer includes at least one selected from the group consisting of Fe, Co and Ni,
the first non-magnetic layer includes at least one selected from the group consisting of Cu, Au, Cr, V, Al and Ag, or at least one selected from the group consisting of Ru, Ir, Ta, Rh, Pd, Pt and W,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt and W,
the fourth non-magnetic layer includes at least one selected from the group consisting of Cu, Au, Cr, V, Al and Ag, and
the fifth non-magnetic layer includes at least one selected from the group consisting of Ru, Ir, Ta, Rh, Pd, Pt and W.

16. The device according to claim 8, wherein
the magnetic element further includes
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first magnetic layer includes at least one selected from the group consisting of Fe, Co and Ni,
the second magnetic layer includes at least one selected from the group consisting of Fe, Co and Ni, the third magnetic layer includes at least one selected from the group consisting of Fe, Co and Ni,
the fourth magnetic layer includes at least one selected from the group consisting of Fe, Co and Ni, and at least one selected from the group consisting of Cr, V, Mn, Ti and Sc,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt and W,
the third non-magnetic layer includes at least one selected from the group consisting of Cu, Au, Cr, V, Al and Ag,
the fourth non-magnetic layer includes at least one selected from the group consisting of Cu, Au, Cr, V, Al and Ag, and
the fifth non-magnetic layer includes at least one selected from the group consisting of Cu, Au, Cr, V, Al and Ag.

17. The device according to claim 8, wherein
the magnetic element further includes
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer, and
a fifth non-magnetic layer provided between the fourth magnetic layer and the second magnetic pole,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni,
the fourth magnetic layer includes at least one selected from the group consisting of Fe, Co and Ni, and at least one selected from the group consisting of Cr, V, Mn, Ti and Sc,
the first non-magnetic layer includes at least one selected from the group consisting of Cu, Au, Cr, V, Al and Ag, or at least one selected from the group consisting of Ru, Ir, Ta, Rh, Pd, Pt and W,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt and W,
the fourth non-magnetic layer includes at least one selected from the group consisting of Cu, Au, Cr, V, Al and Ag, and
the fifth non-magnetic layer includes at least one selected from the group consisting of Cu, Au, Cr, V, Al and Ag.

18. The device according to claim 8, wherein
the magnetic element further includes
a second magnetic layer provided between the first magnetic layer and the second magnetic pole and in contact with the second magnetic pole,
a first non-magnetic layer provided between the first magnetic pole and the first magnetic layer, and
a second non-magnetic layer provided between the first magnetic layer and the second magnetic layer,
the first magnetic layer includes at least one selected from the group consisting of Fe, Co and Ni,
the second magnetic layer includes at least one selected from the group consisting of Fe, Co and Ni, and at least one selected from the group consisting of Cr, V, Mn, Ti and Sc,
the first non-magnetic layer includes at least one selected from the group consisting of Cu, Au, Cr, V, Al and Ag, or at least one selected from the group consisting of Ru, Ir, Ta, Rh, Pd, Pt and W, and
the second non-magnetic layer includes at least one selected from the group consisting of Cu, Au, Cr, V, Al and Ag.

19. The device according to claim 8, wherein
the magnetic element further includes
a second magnetic layer provided between the first magnetic layer and the second magnetic pole,
a third magnetic layer provided between the second magnetic layer and the second magnetic pole and in contact with the second magnetic pole,
a first non-magnetic layer provided between the first magnetic pole and the first magnetic layer,
a second non-magnetic layer provided between the first magnetic layer and the second magnetic layer, and
a third non-magnetic layer provided between the second magnetic layer and the third magnetic layer,
the first magnetic layer includes at least one selected from the group consisting of Fe, Co and Ni,
the second magnetic layer includes at least one selected from the group consisting of Fe, Co and Ni,
the third magnetic layer includes at least one selected from the group consisting of Fe, Co and Ni, and at least one selected from the group consisting of Cr, V, Mn, Ti and Sc,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt and W, and
the third non-magnetic layer includes at least one selected from the group consisting of Cu, Au, Cr, V, Al and Ag.

20. A magnetic recording device, comprising:
a magnetic head including a first magnetic pole, a magnetic element including a first magnetic layer, and a coil; and
a controller electrically connected to the magnetic element and the coil, the controller being configured to supply a recording current to the coil and supply an element current to the magnetic element,
the recording current including a first period of a first polarity, a second period of a second polarity different from the first polarity, a third period that shifts from the first period to the second period, and a fourth period that shifts from the second period to the first period, and
the element current including a DC component and an AC component, the AC component in the first period being same as the AC component in the second period, the AC component in the third period, and the AC component in the fourth period, wherein
a ratio of an amplitude of the AC component to an absolute value of the DC component is not less than 0.1.

21. A magnetic recording device, comprising:
a magnetic head including a first magnetic pole, a magnetic element including a first magnetic layer, and a coil; and
a controller electrically connected to the magnetic element and the coil, the controller being configured to supply a recording current to the coil and supply an element current to the magnetic element,
the recording current including a first period of a first polarity, a second period of a second polarity different from the first polarity, a third period that shifts from the first period to the second period, and a fourth period that shifts from the second period to the first period, and
the element current including a DC component and an AC component, the AC component in the first period being same as the AC component in the second period, the AC component in the third period, and the AC component in the fourth period, wherein
the magnetic head further includes a second magnetic pole,
the magnetic element is provided between the first magnetic pole and the second magnetic pole, and
the magnetic element further includes
a first non-magnetic layer provided between the first magnetic pole and the first magnetic layer, and
a second non-magnetic layer provided between the first magnetic layer and the second magnetic pole,
the first magnetic layer includes at least one selected from the group consisting of Fe, Co and Ni,
the first non-magnetic layer includes at least one selected from the group consisting of Cu, Au, Cr, V, Al and Ag, and
the second non-magnetic layer includes at least one selected from the group consisting of Ru, Ir, Ta, Rh, Pd, Pt and W.

* * * * *